US010977078B2

(12) United States Patent
Rehman

(10) Patent No.: US 10,977,078 B2
(45) Date of Patent: Apr. 13, 2021

(54) SYSTEMS AND METHODS FOR DYNAMIC LOAD DISTRIBUTION IN A MULTI-TIER DISTRIBUTED PLATFORM

(71) Applicant: Verizon Digital Media Services Inc., Dulles, VA (US)

(72) Inventor: Muhammad Rehman, San Jose, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 16/545,293

(22) Filed: Aug. 20, 2019

(65) Prior Publication Data

US 2021/0055959 A1  Feb. 25, 2021

(51) Int. Cl.
*G06F 15/16* (2006.01)
*G06F 9/48* (2006.01)
*G06F 9/50* (2006.01)
*H04L 29/08* (2006.01)

(52) U.S. Cl.
CPC .......... *G06F 9/4881* (2013.01); *G06F 9/4812* (2013.01); *G06F 9/5038* (2013.01); *G06F 9/5055* (2013.01); *H04L 67/101* (2013.01); *H04L 67/1008* (2013.01); *H04L 67/322* (2013.01)

(58) Field of Classification Search
CPC .... G06F 9/4881; G06F 9/5055; G06F 9/4812; G06F 9/5038; H04L 67/1008; H04L 67/101; H04L 67/322
See application file for complete search history.

(56) References Cited

U.S. PATENT DOCUMENTS

| 9,246,986 | B1* | 1/2016 | Ward, Jr. ............ | H04M 15/765 |
|---|---|---|---|---|
| 2013/0019311 | A1* | 1/2013 | Swildens ............... | G06F 9/505 |
| | | | | 726/23 |
| 2015/0244563 | A1* | 8/2015 | Tung ....................... | H04L 43/16 |
| | | | | 709/214 |
| 2015/0317595 | A1* | 11/2015 | De ......................... | G06F 9/4843 |
| | | | | 705/7.15 |
| 2018/0260746 | A1* | 9/2018 | Xiong ................... | G06F 40/295 |

* cited by examiner

*Primary Examiner* — Padma Mundur
(74) *Attorney, Agent, or Firm* — Ansari Katiraei; Arman Katiraei; Sadiq Ansari

(57) ABSTRACT

A controller provides dynamic load distribution in a multi-tier distributed platform. The controller may receive a request at a first Point-of-Presence ("PoP") with a first set of resources. The first PoP may be part of a distributed platform with several distributed PoPs at different network locations. The controller may classify the requested task with a priority, may determine resource availability, and may dynamically distribute the request by (i) providing the request to the first set of resources in response to classifying the task with a high first priority, and determining the availability of the first set of resources to be less than a threshold, and (ii) providing the request to a second PoP in response to classifying the task with a lower second priority, and determining the availability of the first set of resources to be less than the threshold.

15 Claims, 14 Drawing Sheets

SYSTEMS AND METHODS FOR DYNAMIC LOAD DISTRIBUTION IN A MULTI-TIER DISTRIBUTED PLATFORM

BACKGROUND

Content Delivery Networks ("CDNs") and other distributed platforms optimize content delivery, service delivery, function execution, and/or other tasks by distributing requests for these tasks to a Point-of-Presence ("PoP") of the distributed platform that is closest to the requestor, and by completing the task using resources of that closest PoP. The distribution of requests to the closest PoP may occur regardless of who requests a task, the task that is requested, or the originator who created the content, service, or function being requested (e.g., content provider, service provider, and/or function creator).

The distribution of requests to the closest PoP may lead to a suboptimal usage of the distributed platform resources and/or suboptimal task performance. For instance, low priority tasks (e.g., infrequently requested content, latency insensitive tasks, etc.) may compete for the same resources as high priority tasks when the tasks are distributed equally. When demand is sufficiently high, there may be insufficient resources at a PoP to immediately respond to all incoming requests at the PoP. Consequently, task performance of the PoP may be compromised as some requests may be queued until the PoP has available resources to execute the tasks. Also, the request distribution based on proximity can lead to some PoPs being overrun while other PoPs are underutilized, further exacerbating the suboptimal usage of resources and/or suboptimal performance.

Different PoPs may also be configured with different resources, and the different resources, as well as the location of the resources, may lead to some low priority tasks being completed faster than some high priority tasks. For example, a first PoP may be close to a particular network entry point, and a second PoP may be one tier removed from the first PoP. The first PoP may complete tasks with extremely low latency but may be resource limited, whereas the second PoP may complete tasks with higher latency but may have more available resources to simultaneously execute more tasks than the first PoP. In this example, the user experience for a first set of users that are closer to the first PoP may vary greatly from a second set of users that are closer to the second PoP regardless of what tasks are requested by each user, who is requesting a task, or what priority is assigned to a task.

DETAILED DESCRIPTION OF PREFERRED EMBODIMENTS

Figure 1:
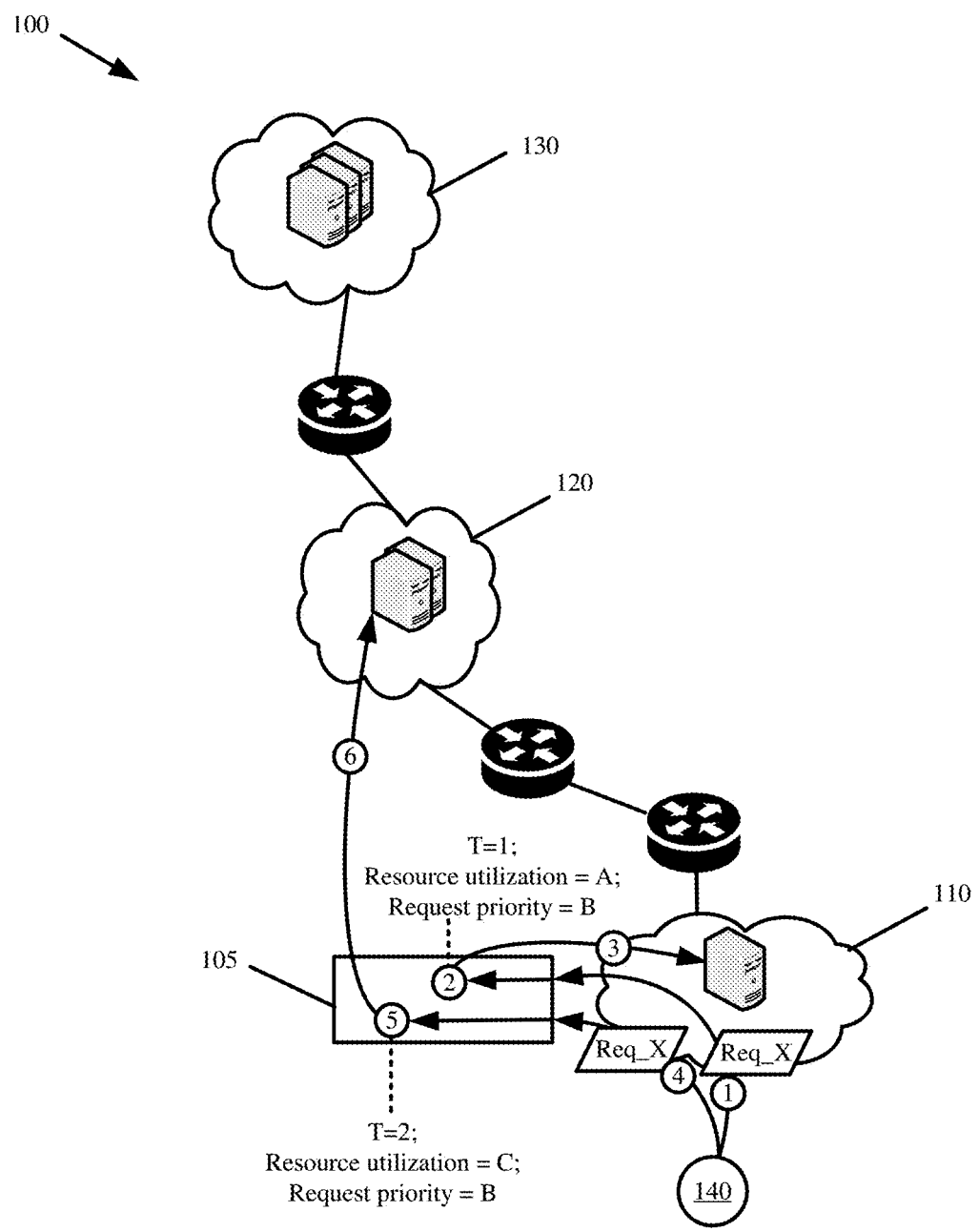
FIG. 1 illustrates an example of the dynamic load distribution in accordance with some embodiments presented herein.

The following detailed description refers to the accompanying drawings. The same reference numbers in different drawings may identify the same or similar elements.

Disclosed are systems and methods for dynamic load distribution in a multi-tier distributed platform. The dynamic load distribution may include distributing requests, that originate from a particular region, that originate from a particular set of user equipment ("UE"), and/or that initially route to a particular Point-of-Presence ("PoP") or tier of the distributed platform differently depending on resource availability, pricing, performance requirements, task priority, UE priority, task originator priority, and/or other criteria. For instance, the dynamic load distribution may change the request distribution across different PoPs or tiers of the distributed platform to maximize task completion and performance for all UEs when caching, compute, and/or other resources of the distributed platform are abundant, and to prioritize completion and performance for high priority tasks over low priority tasks when the caching, compute, and/or other resources are limited. Maximizing task completion and performance may include changing distribution of different requests for the same task based on resource availability, pricing, performance requirements, the requesting UE, the requested task, the task originator, and/or other criteria.

In some embodiments, the dynamic load distribution ensures, that regardless of where demand originates from and regardless of the resources at a particular PoP, the particular PoP will have sufficient resources available to immediately respond to and provide maximum performance for high priority tasks without low priority tasks competing for the same resources when resource availability is low, and that the total utilization of the particular PoP does not result in degraded performance for high priority tasks. In some embodiments, the dynamic load distribution may change the request distribution to maximize performance and task completion to account for different resources and performance at different PoPs or tiers of the distributed platform. For instance, the distributed platform may have a first tier of PoPs with extremely low latency and resource limited Multi-Access Edge Compute ("MEG") resources that are closest to different edges of the network, a second tier of PoPs with higher latency and larger clusters of resources deeper into the network but regional to different subsets of the first tier, and a third tier of PoPs with the highest latency and the largest concentration of resources centralized within the distributed platform. The dynamic load distribution may involve dynamically differentiating high priority tasks from low priority tasks based in part on the resources at each tier such that requests for the same or different tasks originating from the same UE or same region are not necessarily distributed to the first-tier PoP that is closest to the request originating UE or region.

The dynamic distribution of requests may be controlled by a controller. The controller may dynamically modify the request distribution for requests that originate from the same region (e.g., the same UE or different UEs in the same region) or that are directed to the same task based on resource availability, pricing, performance requirement, the requesting UE, the requested task, the task originator, and/or other criteria. Accordingly, the controller may distribute the same requests to different PoPs or tiers of the distributed platform at different times based on real-time analysis of the various criteria.

In some embodiments, the controller may use artificial intelligence and/or machine learning to continually adjust request distribution in real-time in order to maximize task completion (e.g., low priority tasks and high priority tasks) at the fastest-performing PoPs or tiers when those nodes or tiers have abundant resources, and to prioritize completion of high priority tasks at the fastest-performing PoPs or tiers while completing low priority tasks at slower performing PoPs or tiers when resources at the fastest-performing PoPs are limited. In particular, the controller may use artificial intelligence and/or machine learning to change the classification of a high priority task and a low priority task, and thereby change the distribution of the requests based on the changing classification of different tasks identified in the requests. For instance, the controller may generate predictive models for expected demand from different regions, expected demand for different tasks, and expected demand for different resources of the distributed platform based on patterns in prior requests (e.g., the number of UEs that request different tasks, the locations of those UEs, the resources needed to execute the tasks, performance requirements associated with each task, etc.) that are derived via artificial intelligence and/or machine learning. The controller may then reclassify tasks as high priority or low priority at different times based on the predictive models. Consequently, the controller performs a changing or dynamic request distribution, rather than a persistent, consistent, or uniform request distribution.

FIG. 1 illustrates an example of the dynamic load distribution in accordance with some embodiments presented herein. FIG. 1 includes distributed platform 100 with controller 105, first-tier PoP 110, second-tier PoP 120, and third-tier PoP 130. In this figure, the different tiers are referenced relative to UE 140 with first-tier PoP 110 being geographically closest or the least number of network hops from UE 140, second-tier PoP 120 being a greater number of network hops from UE 140 than first-tier PoP 110, and third-tier PoP 130 being a greater number of network hops from UE 140 than second-tier PoP 120.

UE 140 may issue requests for content, services, code execution (e.g., remote computing), and/or other tasks that are hosted, performed, and/or provided by distributed platform 100 from one or more of first-tier PoP 110, second-tier PoP 120, and third-tier PoP 130. For instance, UE 140 may issue (at 1) a first request for a particular task at a first time. The first request may include a Uniform Resource Locator ("URL"), and the first request may route to a location in distributed platform 100 because of the URL or addressing associated with the URL.

Controller 105 may receive (at 1) the first request at the first time, may identify (at 2) resource utilization across the different PoPs or tiers of distributed platform 100 at the first time, and/or may identify (at 2) a priority of the particular task, UE 140, and/or the originator of the task that is requested. For instance, controller 105 may identify that first-tier PoP 110, that is closest to UE 140 and that can complete the particular task faster than other PoPs (e.g., second-tier PoP 120 and third-tier PoP 130), has at least a threshold amount of available resources at the first time, and may determine that the particular task is a low priority task.

Controller 105 may route, forward, or direct (at 3) the first request to first-tier PoP 110 to provide the highest quality of service and fastest completion of the particular task for UE 140 based on the detected low resource utilization at first-tier PoP 110, even though controller 105 determines that the first request is directed to a low priority task. Completion of the particular task may include first-tier PoP 110 providing requested content, providing a requested service, or executing function (e.g., providing compute resources) for UE 140.

Controller 105 may receive (at 4) a second request for the same particular task from UE 140 at a later second time. In FIG. 1, UE 140 may represent a single user device or different user devices operating from a common geographic region.

Between the first time and the second time, resource utilization across distributed platform 100 may have changed. In particular, controller 105 may determine (at 5) that first-tier PoP 110 no longer has the threshold amount of available resources at the second time, and, as before, may determine (at 5) that the particular task is a low priority task.

Controller 105 may provide (at 6) the second request to second-tier PoP 120, instead of first-tier PoP 110, for completion. Second-tier PoP 120 may provide lesser performance or a lower quality of service than first-tier PoP 110 because of its greater distance to UE 140 (e.g., greater latency) and/or because of different resources. However, by distributing the request for the low priority task away from first-tier PoP 110 at the second time, controller 105 preserves the remaining resources of first-tier PoP 110 for completion of high priority tasks that may be latency sensitive (e.g., video streaming, edge computing for real-time systems, etc.) and/or that require or are guaranteed a certain level of performance. The second request may be fulfilled by second-tier PoP 120 without impacting the user experience as the particular task is determined to be a low priority task that is unaffected by slightly slower performance, that does not require extremely low latency performance, or that is not guaranteed a certain quality-of-service or performance.

FIG. 1 illustrates controller 105 distributing the same request differently at different times as a result of changing conditions in distributed platform 100. The different distribution maximizes performance of distributed platform 100 by ensuring that high priority tasks are completed at the fastest-performing tiers or PoPs for the requesting UEs with a sufficient amount of resources, by permitting lower priority tasks to benefit from the improved performance provided by those tiers or PoPs when excess resources are available, and by ensuring that the lower priority tasks do not degrade performance for the high priority tasks when resources are limited.

Figure 2:
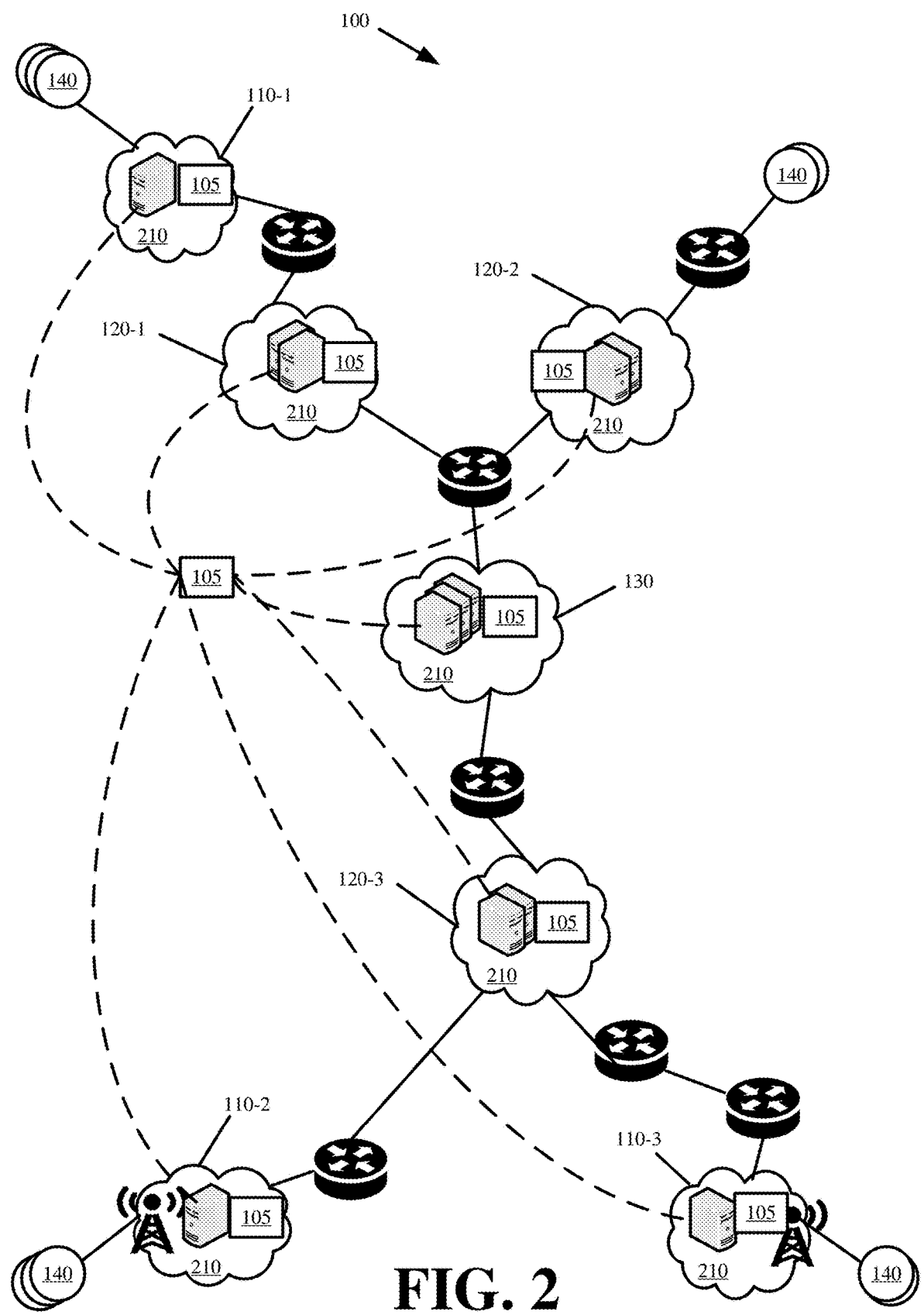
FIG. 2 presents an example distributed platform in accordance with some embodiments presented herein.

FIG. 2 presents an example architecture of distributed platform 100 in accordance with some embodiments presented herein. Distributed platform 100 may be used to distribute content, provide services, execute user-defined operations (e.g., user-defined functions, applications, programs, scripts, code, and/or software), and/or perform other tasks from various PoPs or network locations based on requests issued by UEs 140 that operate in different geographic regions. Distributed platform 100 may perform the tasks on behalf of different task originators. A task originator may include a content provider whose content is uploaded to distributed platform 100 and is distributed by distributed platform 100, a service provider whose service is hosted and accessed from distributed platform 100, and/or a developer whose code is remotely executed on distributed platform 100.

The tasks may be performed at different Points-of-Presence ("PoPs") 110-1, 110-2, 110-3, 120-1, 120-2, 120-3, and 130 of distributed platform 100. Distributed platform 100 may include more or fewer PoPs based on a larger or smaller distributed presence and/or demand.

The PoPs of distributed platform 100 may be hierarchically arranged into different tiers. In FIG. 2, PoPs 110-1, 110-2, and 110-3 represent different first-tier PoPs of distributed platform 100 (herein sometimes collectively referred to as "first-tier PoPs 110" or individually as "first-tier PoP 110"). First-tier PoPs 110 are located closest to different edges of the network or located at or near different network points of entry. In other words, first-tier PoPs 110 may be geographically closest to different groups of UEs 140, and may therefore communicate with those UEs 140 with less latency than other PoPs of distributed platform 100.

In some embodiments, first-tier PoPs 110 may correspond to MEC resources that may be deployed and/or operated by a telecommunications network operator at or near one or more Radio Access Networks ("RANs") and/or base stations of the telecommunications network. In some other embodiments, first-tier PoPs 110 may include MEC or other edge resources of another operator. In any case, first-tier PoPs 110 may be used to provide extremely low latency content distribution, services, processing, and/or data to UEs 140 that operate from the network point(s) of entry at or near each PoP 110-1, 110-2, or 110-3.

PoPs 120-1, 120-2, and 120-3 may be second-tier PoPs of distributed platform 100 (herein sometimes collectively referred to as "second-tier PoPs 120" or individually as "second-tier PoP 120"). Second-tier PoPs 120 may correspond to PoPs of a Content Delivery Network ("CDN") or other distribution network. Second-tier PoPs 120 may be additional network hops away from the different groups of UEs 140 than first-tier PoPs 110.

Second-tier PoPs 120 may supplement the resources of first-tier PoPs 110. For instance, whereas first-tier PoPs 110 may provide localized resources for completing tasks at the network edge, PoPs 120-1, 120-2, and 120-3 of second-tier PoPs 120 may provide regional resources to complete the same tasks as first-tier PoPs 110 deeper into the network.

Distributed platform 100 may have more first-tier PoPs 110 than second-tier PoPs 120 because of the localized versus regionalized deployment of PoPs. Moreover, first-tier PoPs 110 may have fewer resources (e.g., caching, computing, etc.) than second-tier PoPs 120, because the localized deployment of first-tier PoPs 110 results in each first-tier PoP 110 servicing a potentially smaller set of UEs 140 than second-tier PoPs 120.

PoP 130 may represent a third-tier PoP (also referred to as "third-tier PoP 130") of distributed platform 100. PoP 130 may include a centralized resource cluster that is configured with all content, services, functions, and/or other tasks performed by distributed platform 100, and first-tier PoPs 110 and second-tier PoPs 120 may retrieve those content, services, functions, and/or other tasks from third-tier PoP 130 when a request results in a miss at the corresponding first or second-tier PoP, or may forward requests to third-tier PoP when the first or second-tier PoPs have insufficient resources to complete a requested task. In other words, the hierarchical arrangement allows for a request, that is initially received by first-tier PoP 110, to be completed at second-tier PoP 120, when the requested task cannot be completed by that first-tier PoP 110 and/or results in a "miss" at that first-tier PoP 110. Similarly, the request may be completed at third-tier PoP 130 when the requested task cannot be completed by second-tier PoP 120 and/or results in a miss at that second-tier PoP 120.

PoPs may be accessed via a common network address. For instance, each PoP may be accessed with a shared Anycast address, and Anycast routing may route requests issued by UEs 140, that are directed to the Anycast address, to the closest PoP. The closest PoP may be determined based on Border Gateway Protocol ("BGP") routing tables, a number of network hops, latency, and/or other criteria. Additionally, or alternatively, each PoP may be assigned a different and unique network address. Domain Name System ("DNS") request resolution may be used to resolve requests with a common domain name to the network address of a geographically closest PoP.

Each PoP may include one or more devices 210. Each device 210 in a PoP may correspond to a server that can perform one or more tasks. Each device 210 may be assigned and accessed using a different network address.

Each device 210 may include processor, memory, storage, and/or other hardware resources that can be configured in order to respond to UE 140 issued requests and complete requested tasks. For instance, memory of device 210 may be configured as a cache in order to store different content so that the content can be served directly in response to a UE 140 issued request without first retrieving that content from a more remote device or storage. Similarly, different functions may be loaded into memory of device 210, and the processor of that device 210 may be allocated to execute one or more of the functions in response to UE 140 issued requests directed to those functions.

In some embodiments, devices 210 in the same PoP or in different PoPs may have different resources for completing different tasks at different rates. For instance, device 210 in first-tier PoP 110 may have less memory than device 210 in second-tier PoP 120.

The collective resources of each PoP may be defined by the resources of devices 210 in that PoP. The collective resources of different devices 210 in a particular PoP may be used to simultaneously perform different requested tasks.

In some embodiments, third-tier PoP 130 may have more total resources than each of second-tier of PoPs 120, and each second-tier PoP 120 may have more total resources than each first-tier PoP 110. In some other embodiments, resources of PoPs at the different tiers may vary based on expected load. For instance, first-tier PoP 110-1 may have more resources than second-tier PoP 120-3 when first-tier PoP 110-1 is at a high traffic network edge and second-tier PoP 120-3 is at a low traffic region of the network, and first-tier PoP 110-2 may have fewer resources than first-tier PoP 110-1 and second-tier PoP 120-3 when located at a low traffic network edge.

Distributed platform 100 may also include controller 105. Controller 105 may be a distributed or centralized device within distributed platform 100.

In a distributed implementation, controller 105 may have a different instance running in each PoP. Each distributed instance may collect statistical data and monitor status of that PoP as well as control request distribution in that PoP. The data and status from each PoP can be shared between the different controller 105 instances in order to provide each controller 105 with load and resource utilization across distributed platform 100. In such a distributed implementation, controller 105 may run in conjunction with or operate as a load balancer, gateway router, or director that can access each inbound request and that can further monitor resources of each device 210 in the corresponding PoP. In some such embodiments, each controller 105 may control request distribution within a PoP as well as redirect requests to other PoPs.

In a centralized implementation, controller 105 may be a single device that is communicatively coupled to each PoP. Controller 105 may collect request data and statistical data from each PoP. In some such embodiments, controller 105 may update configurations of load balancers, gateway routers, and/or directors that control request distribution at each PoP, and thereby remotely control the request distribution in each PoP. In particular, the configuration updates provided by controller 105 may modify how the load balancers, gateway routers, and/or directors distribute requests for the same task within a PoP and between PoPs at different times. Moreover, in the centralized implementation, requests issued by UEs 140 for tasks performed by distributed platform 100 may be resolved and/or routed to the network address assigned to the centralized controller 105, rather than a closest first-tier PoP 110.

UEs 140 are devices that request different tasks from distributed platform 100. This may include requesting content, services, function execution, and/or other tasks. Each UE 140 may correspond to a different user, and each UE 140 may request multiple tasks. The requests may include HyperText Transfer Protocol ("HTTP") messaging or other network protocol messaging with a URL that identifies the requested task. UEs 140 may include stationary and mobile devices, and can include any network-enabled device that requests tasks and/or receives the task results from distributed platform 100 via one or more data networks.

Figure 3:
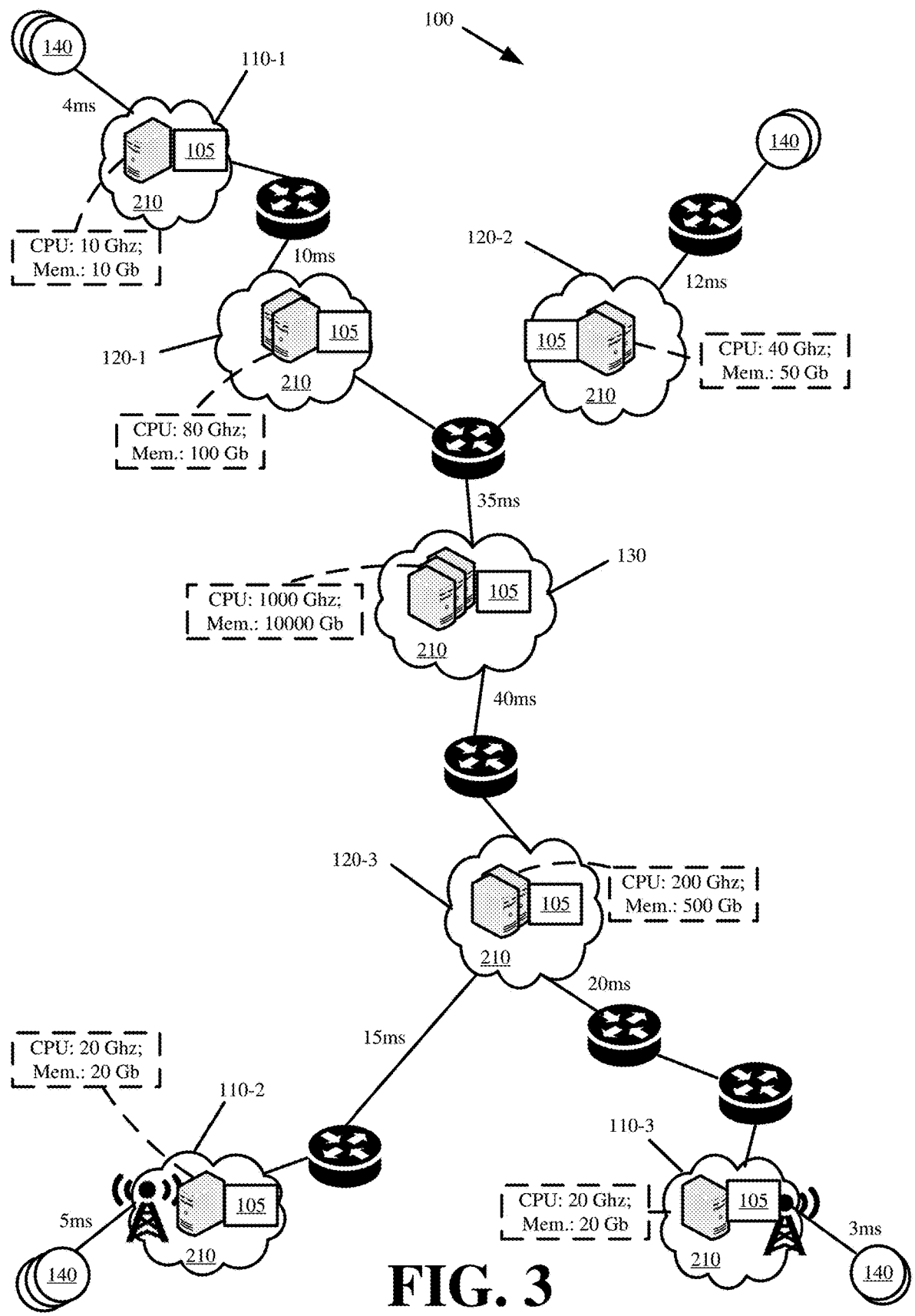
FIG. 3 illustrates an example of different performance and resources at each Point-of-Presence ("PoP") of the distributed platform in accordance with some embodiments.

FIG. 3 illustrates an example of different performance and resources at each PoP of distributed platform 100 in accordance with some embodiments. For instance, FIG. 3 illustrates example average latency between different UEs 140 and PoPs. First-tier PoPs 110, because of their geographic proximity to different sets of UEs 140, may have the lowest average latency and may be the fastest task performing PoP for the nearest set of UEs 140 because of the geographic proximity. FIG. 3 also illustrates an example amount of resources at each PoP that may be used to performed requested tasks. As shown, different PoPs may have different resources. Some PoPs may be optimized to perform compute tasks by having abundant processing resources, and other PoPs may be optimized for content distribution by having abundant cache (e.g., memory or storage) resources.

In some embodiments, the fastest-performing PoP for a UE issued request may be the PoP that can complete the task in the least amount of time using its available resources while also accounting for the latency between the UE and PoP. Accordingly, first-tier PoP 110 may not be the fastest-performing PoP for a nearby UE 140 when that first-tier PoP 110 has insufficient available resources to perform the task, and the insufficient available resources may result in the task being queued until the resources are made available. Alternatively, the insufficient available resources may result in completing the task with fewer resources and more delay than another more distant PoP that can allocate more resources to completing the task.

Figure 4:
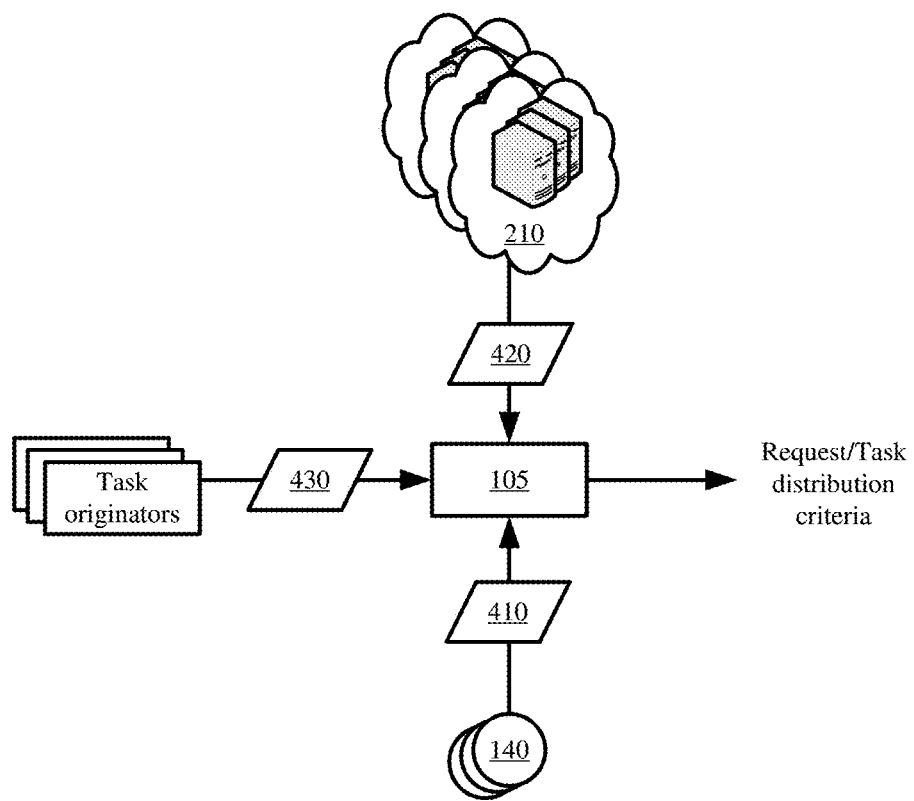
FIG. 4 illustrates different inputs used by a controller to adjust request distribution in the distributed platform in accordance with some embodiments presented herein.

FIG. 4 illustrates different inputs used by controller 105 to adjust request distribution in distributed platform 100 in accordance with some embodiments presented herein. Controller 105 may obtain first set of input 410 from UEs 140, second set of inputs 420 from devices 210 in the different PoPs of distributed platform 100, and third set of inputs 430 from the task originators that provide the content, services, code, and/or tasks to distributed platform 100 for distribution or execution. Controller 105 may continually receive and process the first, second, and third sets of inputs 410, 420, and 430 in order to maintain a real-time status of resource availability at each PoP, and to monitor a real-time status of the load at each PoP.

In some embodiments, first set of inputs 410 may be derived from the requests that are issued by UEs 140. Controller 105 may determine task priority based on the requests. For instance, controller 105 may prioritize frequently requested tasks (e.g., assign a higher priority) over less frequently requested tasks (e.g., assign a lower priority) so that requests for the frequently requested tasks may be distributed to first-tier PoPs 110-1, 110-2, and 110-3 for fastest possible task completion, while requests for infrequently requested tasks may be distributed to second-tier PoPs 120-1, 120-2, and 120-3 or third-tier PoP 130 that may provide slower task completion relative to first-tier PoPs 110-1, 110-2, and 110-3. The difference in task completion performance may be due to distance between requesting UEs 140 and where the tasks are performed, and also due to task pollution at PoPs. For instance, by distributing the requests for the frequently requested tasks to first-tier PoPs 110-1, 110-2, and 110-3, devices 210 within these PoPs can serve already cached content, provide already initialized services, execute code that is already loaded in memory, etc. so that PoPs 110-1, 110-2, and 110-3 are used to reperform the same set of tasks without continual reconfiguration. Conversely, the distribution of the infrequently requested tasks to second-tier PoPs 120-1, 120-2, and 120-3 or third-tier PoP 130 may cause devices 210 within these PoPs to continually retrieve new content, load new services, execute different code, etc. which limits the ability to reuse resources within these PoPs 120-1, 120-2, 120-3, or 130 for multiple tasks, thereby leading to slower performance.

Controller 105 may also use first set of inputs 410 or UE issued requests to obtain information about each requesting UE 140. For instance, controller 105 may determine if a particular UE 140 is stationary or moving, may obtain request history of that UE 140, may obtain the UE type (e.g., autonomous vehicle, mobile handset, desktop computer, etc.), may obtain the UE priority (e.g., a UE that relies on real-time services), may determine service pricing (e.g., a UE that has paid for a higher quality of service), and/or may determine other characteristics about the particular UE 140 or the user associated with the UE. Controller 105 may also use artificial intelligence or machine learning to build UE 140 profiles or predictive models that indicate what tasks each UE 140 may request at different times.

In some embodiments, second set of inputs 420 may include resource utilization data that is collected from devices 210 in each PoP. From second set of inputs 420, controller 105 may track consumed and available resources at each PoP. For instance, controller 105 may track available compute or processing resources, memory, bandwidth, cache, and/or other resources. Controller 105 may also track cached content, running services, loaded or executing functions, and/or other allocations of the consumed or configured resources. Controller 105 may also track performance of each device 210 and/or PoP based on second set of inputs 420. For instance, controller 105 may track average latency or time for completing different tasks at the different PoPs.

In some embodiments, third set of inputs 430 may be provided by the task originators. Third set of inputs 430 may include task configuration information. Task originators may provide the configuration information in the task metadata, as separate configuration files, or via application programming interfaces ("APIs") with which the configuration information can be entered into distributed platform 100. In some embodiments, controller 105 or a distributed platform 100 administrator may provide the configuration information for different tasks.

Third set of inputs 430 and/or the task configuration information may specify the priority of different tasks. For instance, third set of inputs 430 may identify the latency sensitivity of a task (e.g., requires completion in under 10 milliseconds, can be completed within 10-20 milliseconds, or can be completed with latency greater than 20 milliseconds), and/or the expected resource utilization for performing the task (e.g., processor, memory, network bandwidth, etc.). Third set of inputs 430 may also identify the task popularity or demand, fees paid by the task originator, performance guarantees obtained by the task originator, a desired quality of service, priority given to the task originator (e.g., large volume customer versus a small customer), and/or other task originator related parameters. For example, a task originator may have a latency sensitive task that is expected to be accessed by millions of UEs 140. The task originator may pay distributed platform 100 to prioritize performance for this task, and third set of inputs 430 may notify controller 105 as to the priority of the latency sensitive task. Specifically, the latency sensitive task may be uploaded to distributed platform 100 with a configuration that prioritizes this task over other tasks such that the task is performed from each of the fastest-performing PoPs, and is provided access to resources of these PoPs over other tasks.

Third set of inputs 430 and/or the task configuration information may be used by controller 105 to limit resource consumption at different PoPs. For instance, a task originator may create a task configuration that permits up to 10 Gigahertz ("Ghz") of compute power usage at third-tier PoP 130, and 3 Ghz of compute power usage at first-tier PoPs 110-1, 110-2, and 110-3 when distributed platform 100 prices or prioritizes resource utilization differently at different tiers or PoPs. For instance, distributed platform 100 may have more available resources at third-tier PoP 130 such that a given task can be allocated more resources if the task originator is willing to accept the greater latency associated with routing requests for that task to third-tier PoP 130 for completion instead of first-tier PoPs 110-1, 110-2, and 110-3.

Controller 105 may use one or more of first, second, and third set of inputs 410, 420, and 430 to dynamically distribute requests and/or tasks across different tiers and PoPs of distributed platform 100. More specifically, controller 105 may maximize performance and provide differentiated quality-of-service for tasks that are prioritized based on first, second, and third set of inputs 410, 420, and 430 that identify changing resource availability across distributed platform 100, changing pricing and performance profiles of different requesting UEs 140 and requested tasks of different task originators, and/or other conditions that affect the request and/or task distribution.

Figure 5:
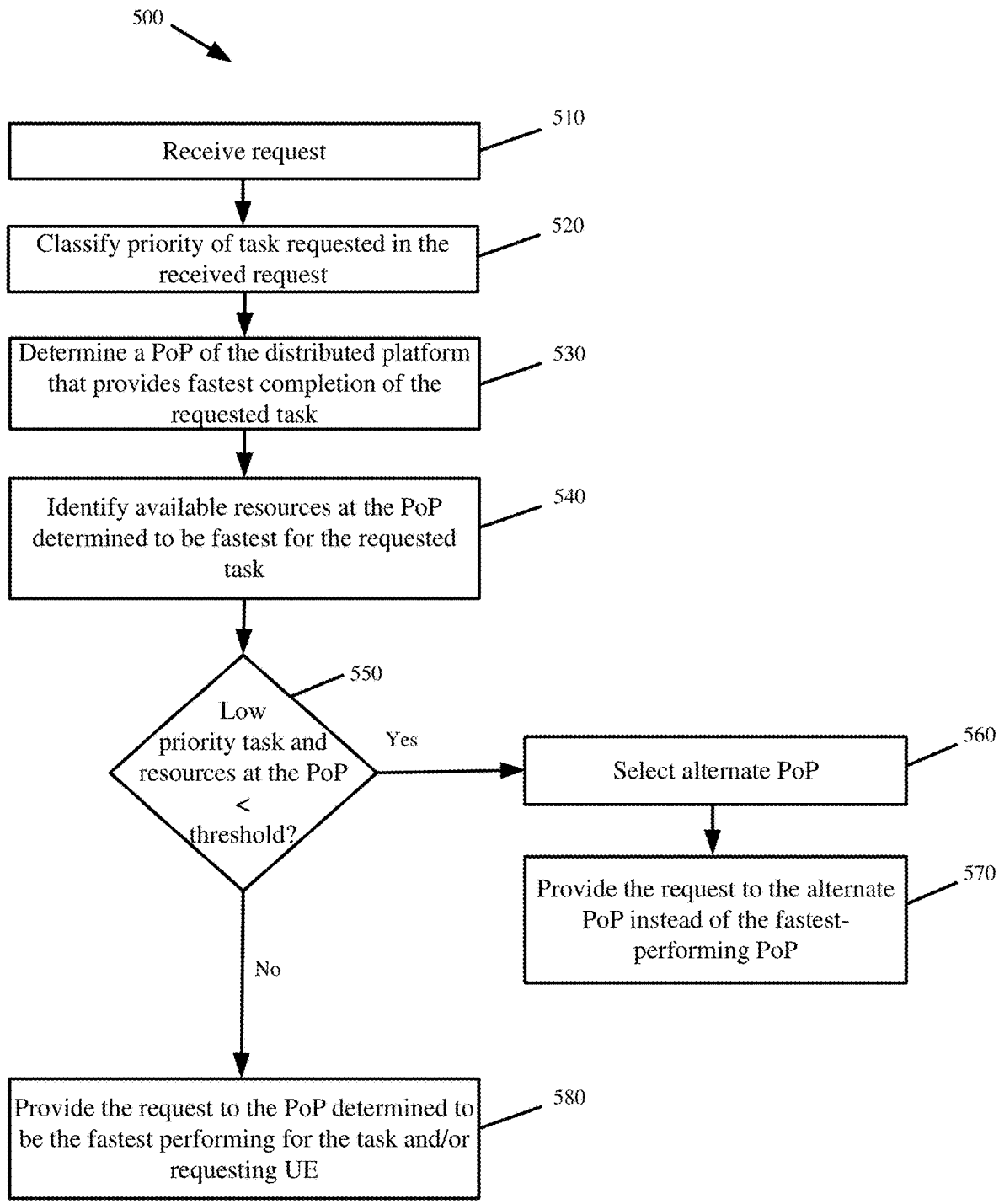
FIG. 5 presents a process for the dynamic load distribution performed by the controller in accordance with some embodiments presented herein.

FIG. 5 presents a process 500 for the dynamic load distribution performed by controller 105 using one or more of first, second, and third sets of inputs 410, 420, and 430 in accordance with some embodiments presented herein. Process 500 may include receiving (at 510) a request for a task at controller 105. The request may be directed to a URL or network address. The request may be routed to a PoP, that is closest to the UE 140 issuing the request, based on the URL or the network address. Controller 105 may be positioned and/or configured to receive all such requests, and may control the distribution of the requests within that PoP and to other PoPs. As noted above, controller 105 may run as part of a load balancer, gateway router, or director of each PoP.

Process 500 may include classifying (at 520) priority of the requested task based on a URL of the request and/or one or more of first, second, and third sets of inputs 410, 420, and 430 that are continuously compiled by controller 105. In some embodiments, the request or requested task may be classified (at 520) as either prioritized or unprioritized, or as either high priority or low priority. In some other embodiments, controller 105 may classify (at 520) the priority of the requested task with more granularity and/or other classifications. For instance, controller 105 may classify a video streaming task (and live video in particular), remote gaming, a real-time service, and a real-time application (e.g., autonomous driving, robotic surgery, flight control, etc.) as an extremely latency sensitive or high priority task, a chat task, messaging task, and website access task as a latency sensitive or medium priority task, and large file downloads or execution of scheduled operations as latency insensitive or low priority tasks.

Some factors from first, second, and third sets of inputs 410, 420, and 430 that may affect the priority classification (at 520) may include whether the requesting UE 140 is a high priority UE 140 (e.g., a UE 140 that paid for improved performance), the requesting UE 140 is stationary or moving, the task originator paid for improved performance for the requested task, and/or the requested task is designated as a high priority task. Controller 105 may weigh each of these inputs equally or differently in classifying the requested task.

Process 500 may include determining (at 530) a PoP of distributed platform 100 that provides fastest completion of the requested task. In some embodiments, the determination (at 530) may be based on which PoP receives the request as a result of being geographically closest to the requesting UE 140. For example, Anycast addressing and/or DNS query resolution may route requests for tasks performed by distributed platform 100 to whichever PoP is closest to the requesting UE 140, and controller 105 may select the fastest-performing PoP based on where the request is routed. In some embodiments, the determination (at 530) may, additionally or alternatively, be based on available resources of PoPs. For example, the request may be received by controller 105 at first-tier PoP 110-1. However, the requested task may be a computationally expensive compute task, and devices 210 in second-tier PoP 120-1 may have significantly more compute power than devices 210 in first-tier PoP 110-1, such that second-tier PoP 120-1, that is one tier removed from first-tier PoP 110-1 receiving the request, may complete the task faster than first-tier PoP 120-1 despite additional latency associated with routing the request and task response the additional network hops to second-tier PoP 120-1. As another example, the request may be routed to first-tier PoP 110-1, and may request content that is not cached at first-tier PoP 110-1 but that is cached at second-tier PoP 120-1. Here again, controller 105 may determine that second-tier PoP 120-1 may complete the content distribution task faster than first-tier PoP 110-1, because second-tier PoP 120-1 may avoid the cache miss penalty and the time needed to retrieve the requested content from remote storage or another tier before responding to the request.

Process 500 may include identifying (at 540) available resources at the PoP that is determined (at 530) to be the fastest for completing the requested task. Controller 105 may reference second set of inputs 420 provided by that PoP to identify (at 540) resource availability.

Process 500 may include determining (at 550) whether the requested task is a low priority task and whether the available resources at the determined PoP are less than a threshold. The determination (at 550) may be based on the results of classifying (at 520) the priority of the requested task and identifying (at 540) the available resources of the PoP. The threshold may be a fixed or variable amount of resources defined according to network conditions and/or total resources of each PoP. Moreover, the threshold may encompass one or more resources of a PoP depending on the requested task. For instance, the determination (at 550) may include determining whether the fastest-performing PoP has at least 1 gigabyte or at least 15% of unused cache memory when the requested task is a request for content, and may include determining whether the fastest-performing PoP has at least 5 Ghz or at 10% of unused processor cycles when the requested task is a compute task for remote execution of machine-executable instructions or code.

In response to determining (at 550-Yes) that the requested task is a low priority task and the available resources at the fastest-performing PoP are less than the threshold, process 500 may include selecting (at 560) an alternate slower performing PoP or a next-tier PoP that has the threshold amount of resources to complete the task. For example, controller 105 may determine that the request is routed to first-tier PoP 110-1, and first-tier PoP 110-1 is determined to be the fastest-performing PoP for the request as a result of the request routing. Controller 105 may then select (at 560) second-tier 120-1 as the next-tier PoP that is next-closest to the requesting UE 140. As another example, controller 105 may determine that first-tier PoP 110-1 is the fastest-performing PoP, but that the requested task requires more compute resources than are available at either first-tier PoP 110-1 or second-tier PoP 120-1. Accordingly, controller 105 may select (at 560) third-tier PoP 130 as the next-tier PoP with sufficient resources to complete the task. As yet another example, controller 105 may determine that first-tier PoP 110-1 is the fastest-performing PoP, but that the requested task is assigned the lowest priority such that performance is not an issue. In this example, controller 105 may bypass second-tier PoP 120-1, despite second-tier PoP 120-1 having sufficient resources, and may select (at 560) third-tier PoP 130 based on the lowest priority assigned to the requested task in order to preserve resources not only at first-tier PoP 110-1, but also second-tier PoP 120-1. After selecting (at 560) an alternate PoP, process 500 may include providing (at 570) the request to the alternate PoP. In this case, controller 105 may distribute the request from the fastest-performing PoP to the alternate PoP, or may directly distribute the request to the alternate PoP in order to preserve resources at the fastest-performing PoP for high priority tasks while providing next-best performance for a task that is not adversely affected by the lesser performance.

In response to determining (at 550-No) that the requested task is a high priority task or that the available resources at the fastest-performing are greater than the threshold, process 500 may include providing (at 580) the request to the fastest-performing PoP for completion of the task thereat. In this case, controller 105 may distribute the request to one of several devices 210 in the same PoP as controller 105 when the request is routed to the fastest-performing PoP and controller 105 manages request distribution in that PoP. Alternatively, controller 105 may forward the request to the fastest-performing PoP using the specific address of the fastest-performing PoP.

Process 500 may be modified to accommodate different embodiments of the dynamic request distribution. For instance, controller 105 may classify a task as being extremely latency sensitive, latency sensitive, and latency insensitive. Controller 105 may provide the requests for extremely latency sensitive tasks to the closest of first-tier PoPs 110-1, 110-2, and 110-3, may provide the requests for latency sensitive tasks to the closest of second-tier PoPs 120-1, 120-2, and 120-3 when resources at the first-tier PoPs are limited or in all cases to preserve the resources of the first-tier PoPs, and may provide the requests for latency insensitive tasks to third-tier PoP 130 or to the second-tier PoPs 120 when abundant resources are available at second-tier PoPs 120. In this example distribution, controller 105 prevents first-tier PoPs 110 from being used to complete any latency insensitive task, while providing the extremely latency sensitive tasks priority to resources of first-tier PoPs 110 over the latency sensitive tasks.

In some embodiments, controller 105 may score each request (e.g., a request score) or each requested task, and may classify the request based on the scoring. Similarly, controller 105 may score the PoP (e.g., a PoP score) that is determined to be the fastest-performing PoP for a particular request, and may compare the request score against the PoP score to determine if the requested task should be completed at the fastest-performing PoP or an alternate PoP.

Figure 6:
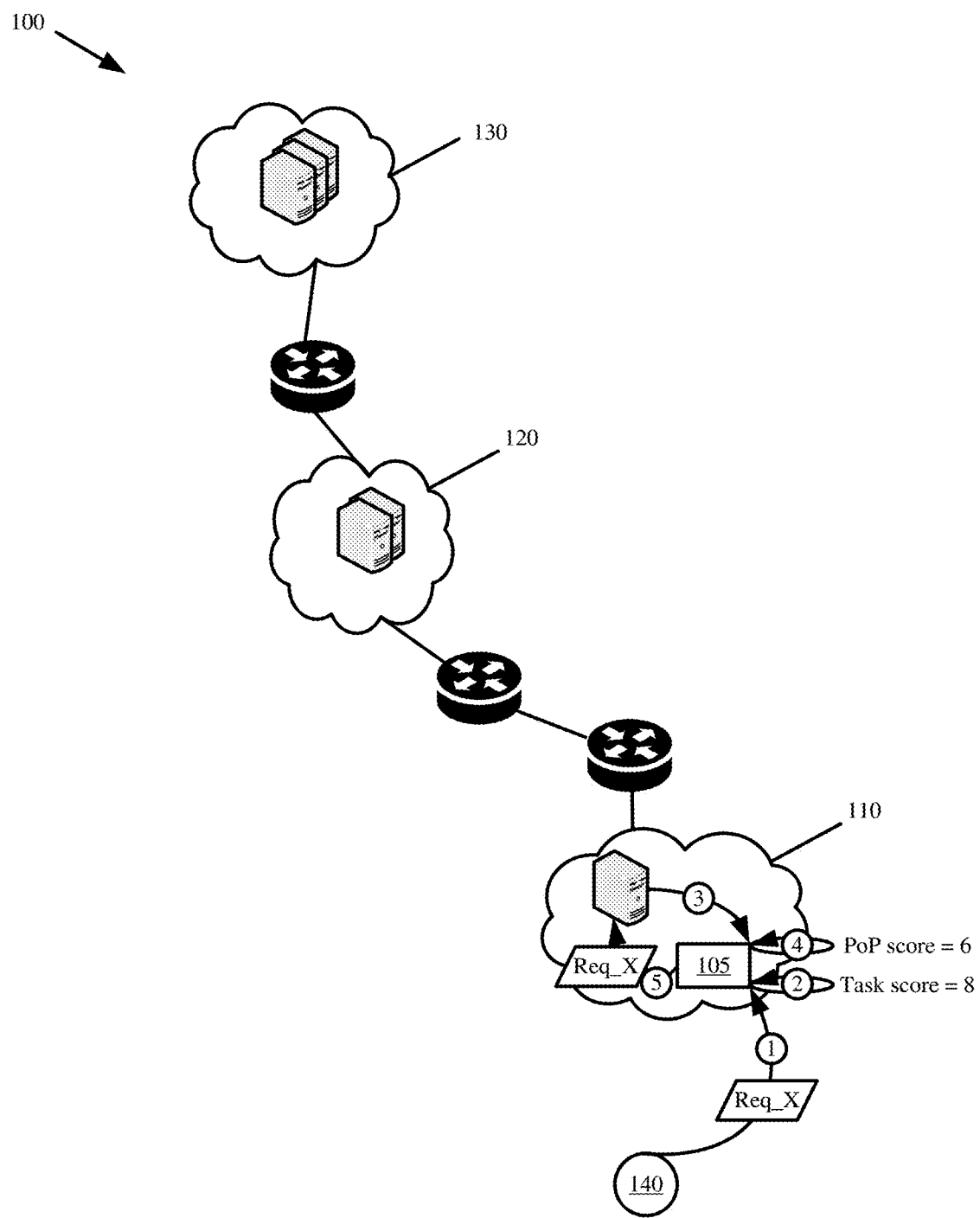
FIG. 6 illustrates an example of dynamically distributing a request based on scoring of the request and PoP resources in accordance with some embodiments presented herein.

FIG. 6 illustrates an example of dynamically distributing a request based on scoring of the request and PoP resources in accordance with some embodiments presented herein. Controller 105 may receive (at 1) a request that includes a URL identifying the task being requested. The request may also include a header that identifies the requesting UE 140. Controller 105 may receive (at 1) the request at first-tier PoP 110 that is the closest PoP of distributed platform 100 to the requesting UE 140. As a result, controller 105 may determine that first-tier PoP 110 is the fastest-performing PoP for the requested task and requesting UE 140.

Controller 105 may perform a lookup of the requested task using the request URL and one or more of first, second, and third sets of inputs 410, 420, and 430 to compute (at 2) a first value relating to the priority of the requested task, requesting UE 140, and/or the task originator. Accordingly, the first value for the request score or task score may factor whether requesting UE 140 has paid for a prioritized quality-of-service, whether the task originator has paid for prioritized performance for the requested task, and/or whether the task is determined to be a high priority task based on request patterns across distributed platform 100 and/or latency sensitivity of the task. Controller 105 may adjust the first value based on other factors including whether requesting UE 140 is stationary or moving, the type of device issuing the request, historic bandwidth utilization of requesting UE 140, resource consumption related to tasks of the same task originator, predictive models, etc. Each of the factors used in computing the first value may be weighed equally or differently depending on the attributed importance of each factor to the request priority or task priority. In this figure, the first value may have a range between 0 and 10 with 0 being the lowest priority and 10 being the highest priority.

Controller 105 may continually monitor (at 3) and/or track resources of first-tier PoP 110. For instance, controller 105 may poll performance, utilization, resource, and/or other metrics from the devices or servers operating in first-tier PoP 110. Controller 105 may compute (at 4) a second value for first-tier PoP 110 based on the available resources of that PoP 110. The second value may correspond to a first-tier PoP score. In some embodiments, controller 105 may continually update scores derived for first-tier PoP 110 and/or other PoPs of the same distributed platform as resource availability and usage of the PoPs change over time. Controller 105 may also compute different scores for different tasks or requests. For instance, controller 105 may compute a first PoP score for a compute task based on the available compute resources of first-tier PoP 110, may compute a second PoP score for a streaming task based on the available bandwidth of first-tier PoP 110, and may compute a third PoP score for a content delivery and caching task based on the available memory of first-tier PoP 110. Alternatively, controller 105 may compute a single score, but may weigh each resource differently based on the resources required to complete the requested task.

In FIG. 6, controller 105 computes a PoP score for first-tier PoP 110 that is less than the computed score for the received request (e.g., the task score). The higher score of the received request or requested task indicates that the task priority is sufficiently high to be completed using the available resources of first-tier PoP 110, or that first-tier PoP 110 has sufficient resources to complete the task with the identified priority. Accordingly, controller 105 may distribute (at 5) the request to one of the devices in first-tier PoP 110 for completion.

If the PoP score exceeded the request score or the task score, controller 105 may distribute the request to a different slower performing PoP (e.g., second-tier PoP 120 or third-tier PoP 130) for completion using resources of one of the devices from those alternate PoPs. In this instance, the priority of the requested task would be insufficient to be completed using the remaining resources of first-tier PoP 110, and the remaining resources of first-tier PoP 110 should be reserved for higher priority tasks.

The scoring allows controller 105 to dynamically distribute requests across distributed platform 100, and to continually adjust the distribution in real-time as resource availability across the distributed platform 100 changes. In other words, controller 105 does not perform a fixed distribution of requests or tasks having a first priority to a first tier, and requests or tasks having a different second priority to a second tier. Instead, requests or tasks, that have the first priority, may be distributed to the first tier during a first time based on a first set of conditions existing within distributed platform 100 at the first time, and the same requests or tasks, that have the same first priority, may be distributed to the second tier or another tier during a second time based on a different second set of conditions existing within distributed platform 100 at the second time.

Figure 7A:
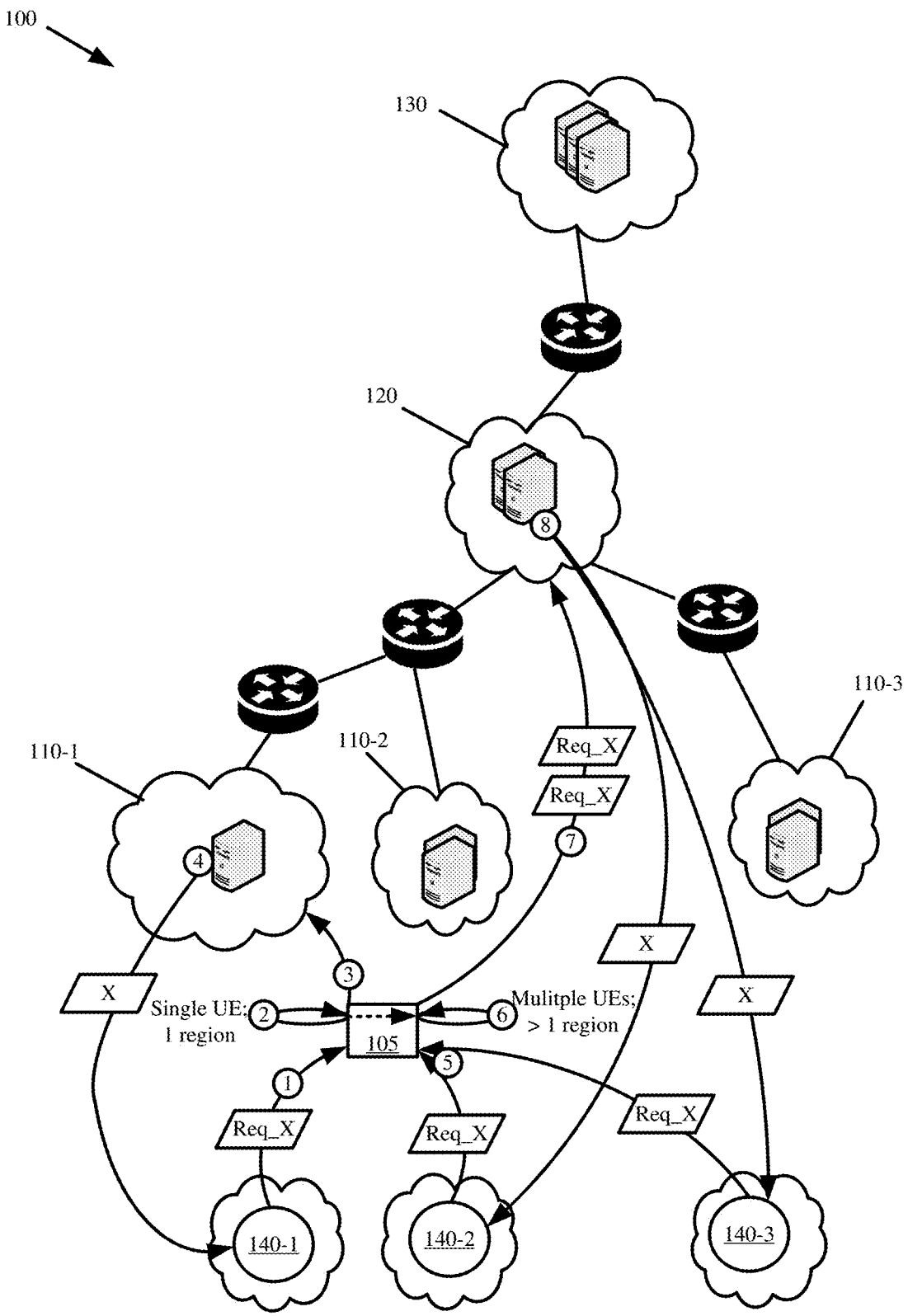
FIG. 7A illustrates an example of dynamic load distribution for different priority tasks and stationary user devices in accordance with some embodiments presented herein.

FIG. 7A illustrates an example of dynamic load distribution provided by controller 105 for different priority tasks and stationary UEs 140 in accordance with some embodiments presented herein. At a first time in FIG. 7A, controller 105 may receive (at 1) a request from first UE 140-1. Controller 105 may determine (at 2) that the request is for a nonprioritized task or that first UE 140-1 is a UE that does not receive prioritized performance from distributed platform 100 (e.g., did not pay for premium service), that first UE 140-1 is stationary, and that resources at closest first-tier PoP 110 exceed a threshold. Controller 105 may determine (at 2) that first UE 140-1 is stationary based on the device type, previous requests from first UE 140-1 coming from the same region, a profile associated with first UE 140-1, location tracking information, and/or other data. In some embodiments, controller 105 may compute a request score, for the received request and requesting UE 140-1, and a PoP score, for first-tier PoP 110-1, and may distribute the request based on a comparison of the scores. In this instance, controller 105 may provide greater priority to the request because of the stationary nature of first UE 140-1. As shown, controller 105 may cause a device in first-tier PoP 110-1 to respond to the request by distributing (at 3) the request to first-tier PoP 110-1. First UE 140 may receive (at 4) the task results from first-tier PoP 110-1 as a result.

At a later second time in FIG. 7A, controller 105 may receive (at 5) additional requests from second and third UEs 140-2 and 140-3 in different regions for the same task that is requested by first UE 140-1. Controller 105 may determine (at 6) that the requests are for the same nonprioritized task, that second UE 140-2 and third UE 140-3 are UEs that do receive prioritized performance from distributed platform 100, that second and third UEs 140-2 and 140-3 are stationary but in different regions that are served by different first-tier PoPs 110-2 and 110-3, and may determine that each of first-tier PoPs 110-2 and 110-3 closest to second and third UEs 140-2 and 140-3 respectively may have resources in excess of the threshold.

In this scenario, controller 105 may use machine learning based on the current set of requests and the prior request submitted by first UE 140-1 and/or prior requests from other UEs to prevent the replication of the same nonprioritized task across different first-tier PoPs 110-1, 110-2, and 110-3. In particular, controller 105 may determine (at 6) that the requested task has become popular, and instead of using resources at just first-tier PoP 110-1 (e.g., a single first-tier PoP), could lead to resource usage at multiple different first-tier PoPs. In the example of FIG. 7A, the total first-tier PoP resource utilization for the low priority requested task could increase threefold.

The machine learning allows controller 105 to detect and prevent this excess first-tier PoP resource utilization despite each individual first-tier PoP 110-1, 110-2, and 110-3 having resources in excess of the threshold. In particular, at the second time, controller 105 may issue (at 7) the requests from second and third UEs 140-2 and 140-3 to second-tier PoP 120 that can perform (at 8) the task for both UEs 140-2 and 140-3, albeit with slightly less performance than performing the tasks at different first-tier PoPs 110-2 and 110-3. However, by using second-tier PoP 120 to perform (at 8) the nonprioritized task for different UEs 140-2 and 140-3 in different regions, the nonprioritized task is instantiated only once at second-tier PoP 120, and consumes only one set of resources at second-tier PoP 120 rather than being instantiated twice and consuming two different sets of resources when performing the nonprioritized task at different first-tier PoPs 110-2 and 110-3.

Controller 105 may select second-tier PoP 120 over first-tier PoPs 110-2 and 110-3 at the second time based in part on the task not being prioritized (e.g., does not request an extremely low latency service), and based in part on controller 105 giving precedence to reusing or sharing resources for a nonprioritized task when multiple UEs 140-1, 140-2, and 140-3 request that task. Accordingly, FIG. 7A illustrates changing load distribution for the same nonprioritized task at the first time and the second time based on the number of UEs 140 requesting that task.

Figure 7B:
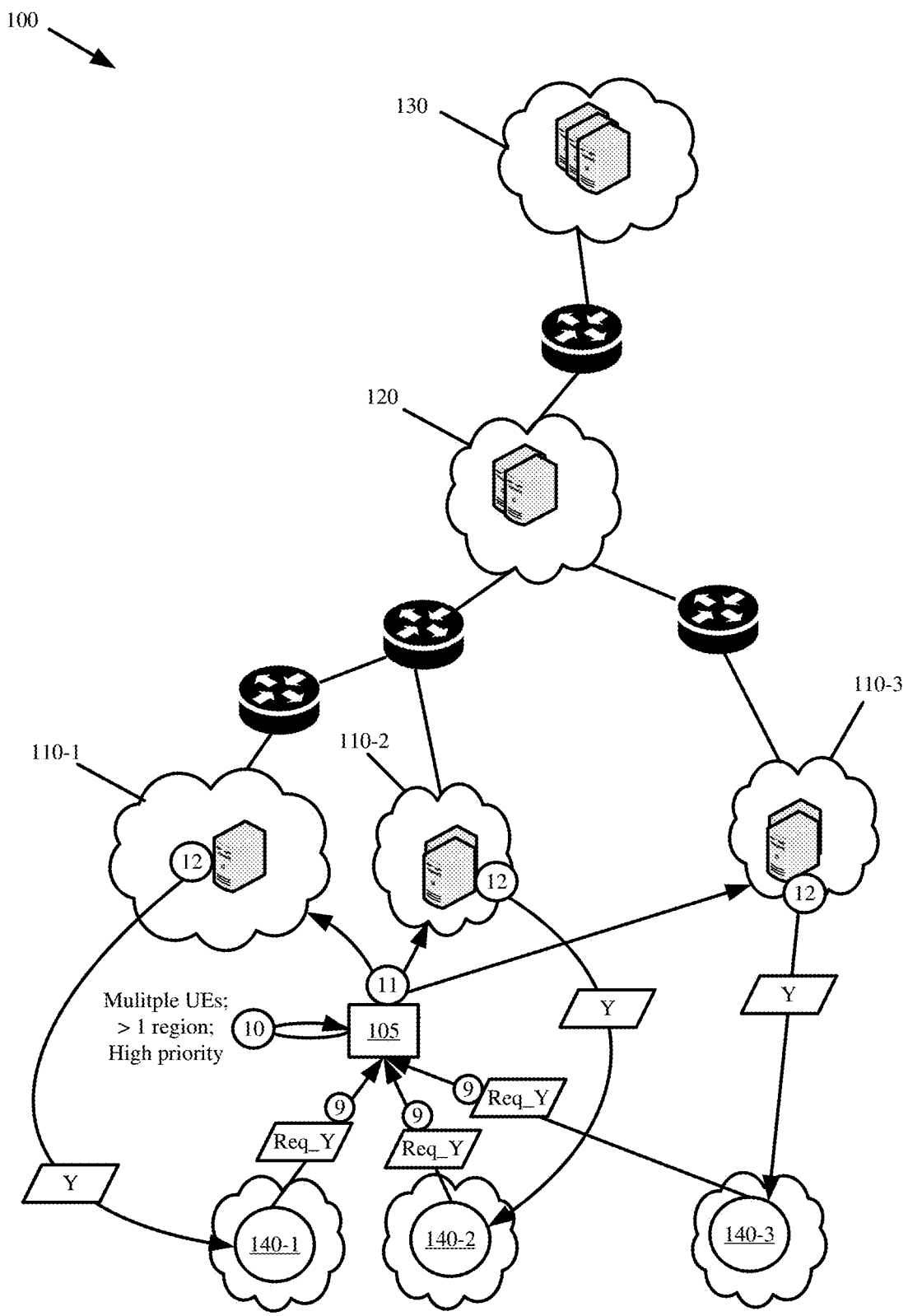
FIG. 7B further illustrates a different load distribution performed for a prioritized task at a third time based on the same user devices requesting the same prioritized task in accordance with some embodiments presented herein.

FIG. 7B further illustrates a different third load distribution performed for a prioritized task at a third time based on the same UEs 140-1, 140-2, and 140-3 requesting that same prioritized task in accordance with some embodiments presented herein. At the third time, controller 105 may receive (at 9) the same request for a prioritized task from UEs 140-1, 140-2, and 140-3.

Controller 105 may determine (at 10) that the requests are for the same prioritized task or that second UE 140-2 and third UE 140-3 are UEs that receive prioritized performance from distributed platform 100 for the newly requested task, and that first, second, and third UEs 140-1, 140-2, and 140-3 are stationary but in different regions that are served by different first-tier PoPs 110-1, 110-2, and 110-3. Unlike at the second time when controller 105 distributed the requests for the same nonprioritized task to single second-tier PoP 120, controller 105 may distribute (at 11) the requests for the same prioritized task to different first-tier PoPs 110-1, 110-2, and 110-3 that are closest to each requesting UE 140-1, 140-2, and 140-3 in order to give precedence to performance (at 12) over resource conservation since the requests are directed to prioritized tasks instead of nonprioritized tasks even though the requests in FIG. 7B originate from the same UEs 140 or same regions as the requests in FIG. 7A, and resources of first-tier PoPs 110-1, 110-2, and 110-3 exceed the threshold at all times (e.g., first time, second time, and third time).

In FIGS. 7A and 7B, controller 105 may have a distributed instance running at each of first-tier PoPs 110-1, 110-2, and 110-3, and the different instances may share request data with one another so that each instance may have a comprehensive view of requests received across distributed platform 100. Alternatively, controller 105 illustrated in FIGS. 7A and 7B may be a centralized device that initially receives requests issued by UEs 140-1, 140-2, and 140-3 and/or other UEs 140 operating in those same regions.

Figure 8:
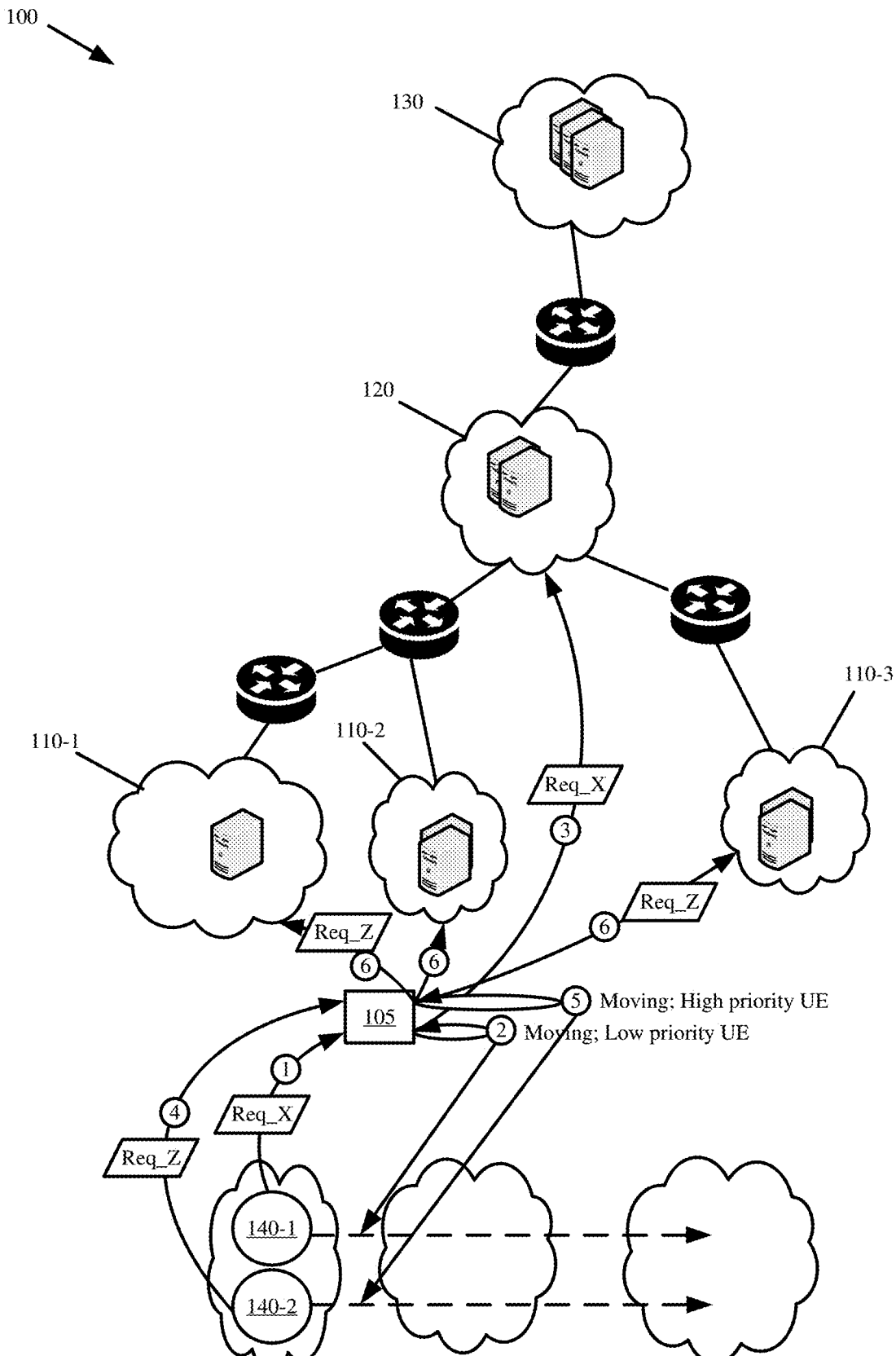
FIG. 8 illustrates an example of dynamic load distribution for different priority tasks and moving user devices in accordance with some embodiments presented herein.

FIG. 8 illustrates an example of dynamic load distribution provided by controller 105 for different priority tasks and moving UEs 140 in accordance with some embodiments presented herein. At a first time in FIG. 8, controller 105 may receive (at 1) a request from first UE 140-1. Controller 105 may determine (at 2) that the request is for a nonprioritized task, that the first UE 140-1 is a UE that does not receive prioritized performance from distributed platform 100, and/or that first UE 140-1 is moving. Controller 105 may use artificial intelligence to further determine (at 2) movement characteristics of first UE 140-1, and to produce (at 2) a predictive model that predicts a projected path of movement for first UE 140-1.

Based on the predictive model, controller 105 may elect to conserve resources and prevent replication of the nonprioritized task across different first-tier PoPs 110-1, 110-2, and 110-3 that cover the projected path of first UE 140-1. Consequently, controller 105 may provide (at 3) the request to second-tier PoP 120 that covers the path, or to a third-tier PoP that can serve all regions.

At a second time, controller 105 may receive (at 4) a request from second UE 140-2. Controller 105 may determine (at 5) that the request is for a prioritized task, that second UE 140-2 is a UE that receives prioritized performance from distributed platform 100, and/or that second UE 140-2 is moving. Controller 105 may again use artificial intelligence to further determine (at 5) movement characteristics of second UE 140-2, and to produce (at 5) a predictive model that predicts a projected path of movement for second UE 140-2.

Based on these factors, controller 105 may provide a different distribution for the request from second UE 140-2 than for the request from first UE 140-1, so that the prioritized task is performed at each of first-tier PoPs 110-1, 110-2, and 110-3 along the projected path of second UE 140-2. For instance, second UE 140-2 may request a live video stream from distributed platform 100, and may move between different RANs that each include a first-tier PoP. Controller 105 may distribute the request to each of first-tier PoPs 110-1, 110-2, and 110-3 in the path, so that second UE 140-2 may receive different segments of the live video stream from whichever first-tier PoP is closest to second UE 140-2. Another example may include prepopulating the same content or different parts of the same content to caches of first-tier PoPs 110-1, 110-2, and 110-3 so that the content can be immediately served from those PoPs when second UE 140-2 enters in range of those PoPs. As another example, controller 105 may instantiate the same service at each first-tier PoP 110-1, 110-2, and 110-3 so that second UE 140-2 can continue to receive that service from whichever of first-tier PoPs 110-1, 110-2, and 110-3 is closest to second UE 140-2 as second UE 140-2 continues moving.

Figure 9:
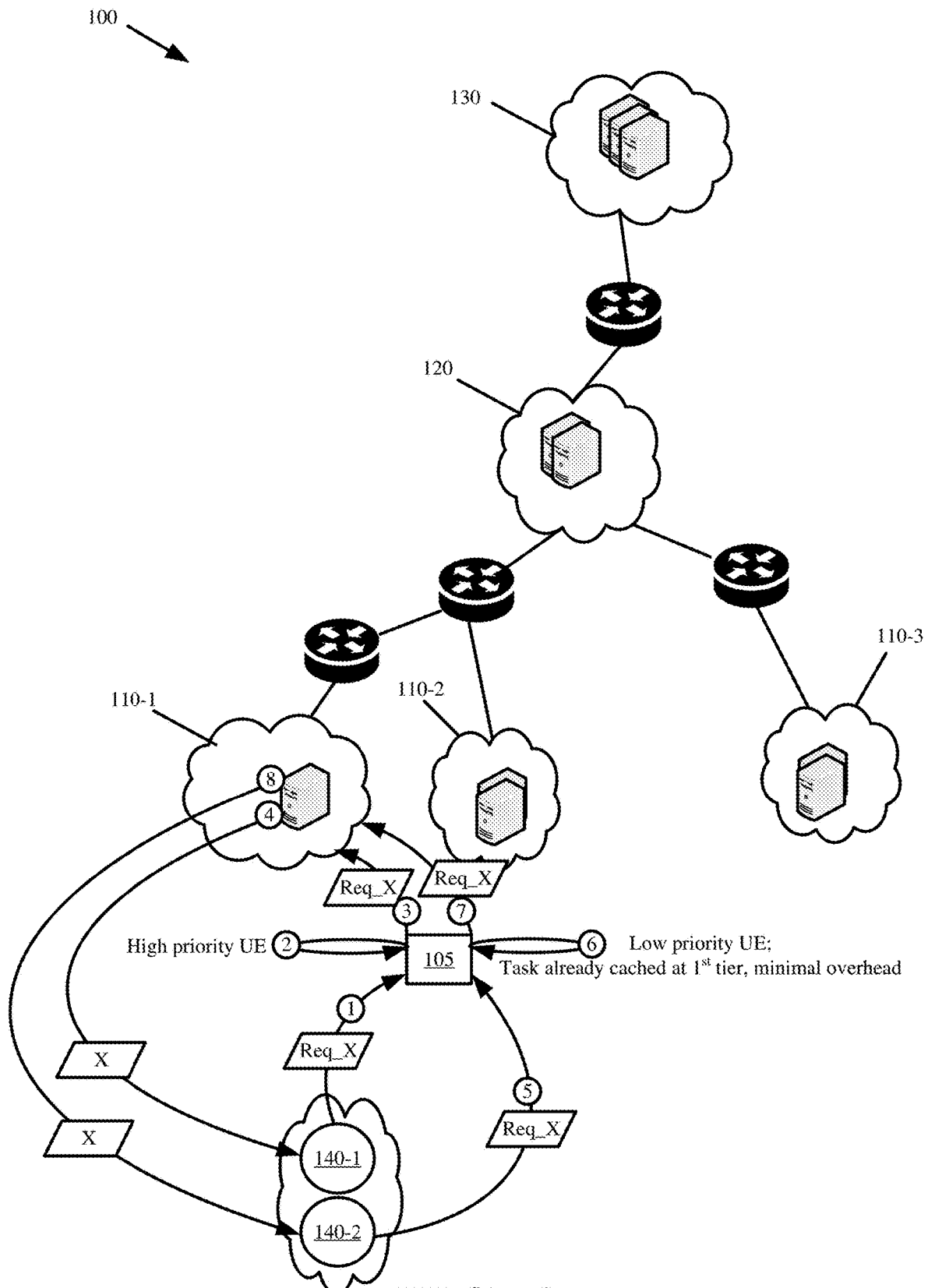
FIG. 9 illustrates an example of dynamic load distribution for different priority user devices in accordance with some embodiments presented herein.

FIG. 9 illustrates an example of dynamic load distribution provided by controller 105 for different priority UEs 140 in accordance with some embodiments presented herein. At a first time in FIG. 9, controller 105 may receive (at 1) a request from first UE 140-1. Controller 105 may determine (at 2) that first UE 140-1 is a UE that is configured to receive the highest quality-of-service. For instance, controller 105 may determine (at 2) that first UE 140-1 is a premium user that has paid for improved service or for a certain minimal level of experience or performance. Accordingly, controller 105 may distribute (at 3) the request to first-tier PoP 110-1 that is closest to first UE 140-1 such that the requested task is performed (at 4) and provided from that first-tier PoP 110-1.

At a second time, controller 105 may receive (at 5) a request for the same task from second UE 140-2 that operates in the same geographic region as first UE 140-1. Controller 105 may determine (at 6) that second UE 140-2 is a standard user (e.g., non-premium user) that receives a regular quality-of-service, and that first-tier PoP 110-1 providing the task to first UE 140-1 does not have resources in excess of the threshold. However, controller 105 may monitor resource consumption and performance of first-tier PoP 110-1 in responding to the request for the same task from first UE 140-1 in order to further determine (at 6) that the requested task is a low-overhead task that requires minimal resources of first-tier PoP 110-1 now that the task has been initialized because of the earlier request by the high priority first UE 140-1. For instance, first and second UEs 140-1 and 140-2 may request the same static content, and the static content may be cached in first-tier PoP 110-1 as a result of serving the static content in response to the request from first UE 140-1. Accordingly, even though resources at first-tier PoP 110 are low and second UE 140-2 is a standard user, controller 105 may distribute (at 7) the request from second UE 140-2 to first-tier PoP 110-1 since the task is already instantiated at first-tier PoP 110-1, and the task can be performed (at 8) at first-tier PoP 110-1 without additional or with minimal resource consumption.

Conversely, if the requested task was a task that consumed a threshold amount of resources of the first-tier PoP even after being instantiated or initialized at first-tier PoP 110-1 as a result of a prior request, controller 105 may distribute the request of second UE 140-2 to second-tier PoP 120, instead of first-tier PoP 110-1, even though the task is already instantiated and available at first-tier PoP 110-1. For instance, the task may be a compute task that consumes memory and processor resources for a certain amount of time each time the compute task is invoked. In this case, controller 105 may determine that the resources of the first-tier PoP are less than the threshold, may determine that second UE 140-2 is a standard user, and may therefore distribute the request from second UE 140-2 to second-tier PoP 120 despite the task being already instantiated and/or available at first-tier PoP 110-1. Specifically, controller 105 may use second-tier PoP 120 to perform the compute task in order to preserve resources at first-tier PoP 110-1 for prioritized tasks or prioritized UEs (e.g., UE 140-1).

In some embodiments, controller 105 may use artificial intelligence and/or machine learning to produce different predictive models that change the request distribution and/or scoring used to determine the distribution. FIG. 8 provided one such example of using artificial intelligence to generate predictive models for the predicted movement of UEs 140. As another example consistent with the modeling in FIG. 8, controller 105 may receive a single request for a high priority task from a moving UE 140. Rather than replicate that task across each of the first-tier PoPs 110 in that user's path, controller 105 may perform a single instance of that task from a second-tier PoP that serves the entire user's path. Conversely, if the same high priority task is requested by different moving UEs 140, controller 105 may use artificial intelligence to model their movements and determine that UEs 140 move in different directions along the same path. Based on this model, controller 105 may distribute the requests across first-tier PoPs 110 in the path to maximize utilization of the configured resources at those first-tier PoPs 110 while also providing UEs 140 with fastest performance.

In some embodiments, controller 105 may use artificial intelligence or machine learning to identify resource utilization of different tasks, and to alter the load distribution based on the identified resource utilization of the different tasks. One example is illustrated above by FIG. 9, whereby low priority UE 140-2, would otherwise not be distributed to first-tier PoP 110-1 but for the earlier request made by high priority UE 140-1 for the same task and the task consuming minimal or insignificant resources of first-tier PoP 110-1 once initialized.

Another example may include controller 105 monitoring resource utilization of different tasks, and determining that a certain task, despite being a prioritized task, may consume more resources than are available at a closest first-tier PoP 110. In this case, delaying the task until the resources at the closest first-tier PoP 110 become available or having the task compete or share resources with other tasks at the closest first-tier PoP 110 may lead to worse performance than performing the task from a more distant (e.g., higher latency) second-tier PoP 120, provided that the second-tier PoP 120 has more resources from which the task can be performed without waiting for resources to become available or competing or sharing resources with other tasks. In this case, controller 105 may dynamically alter the load distribution by distributing the request for the prioritized task to second-tier PoP 120 instead of the closest first-tier PoP 110.

Controller 105 may use artificial intelligence and/or machine learning to generate other predictive models that identify a set of tasks that are expected to become popular at different times, and controller 105 may prioritize completion of the set of tasks from first-tier PoPs 110 by increasing the scoring of requests directed to any of the set of tasks. For instance, controller 105 may use artificial intelligence or machine learning to modify the priority of tasks in response to changing distributed platform conditions, time-of-day, request patterns, demand, and/or other factors.

Figure 10A:
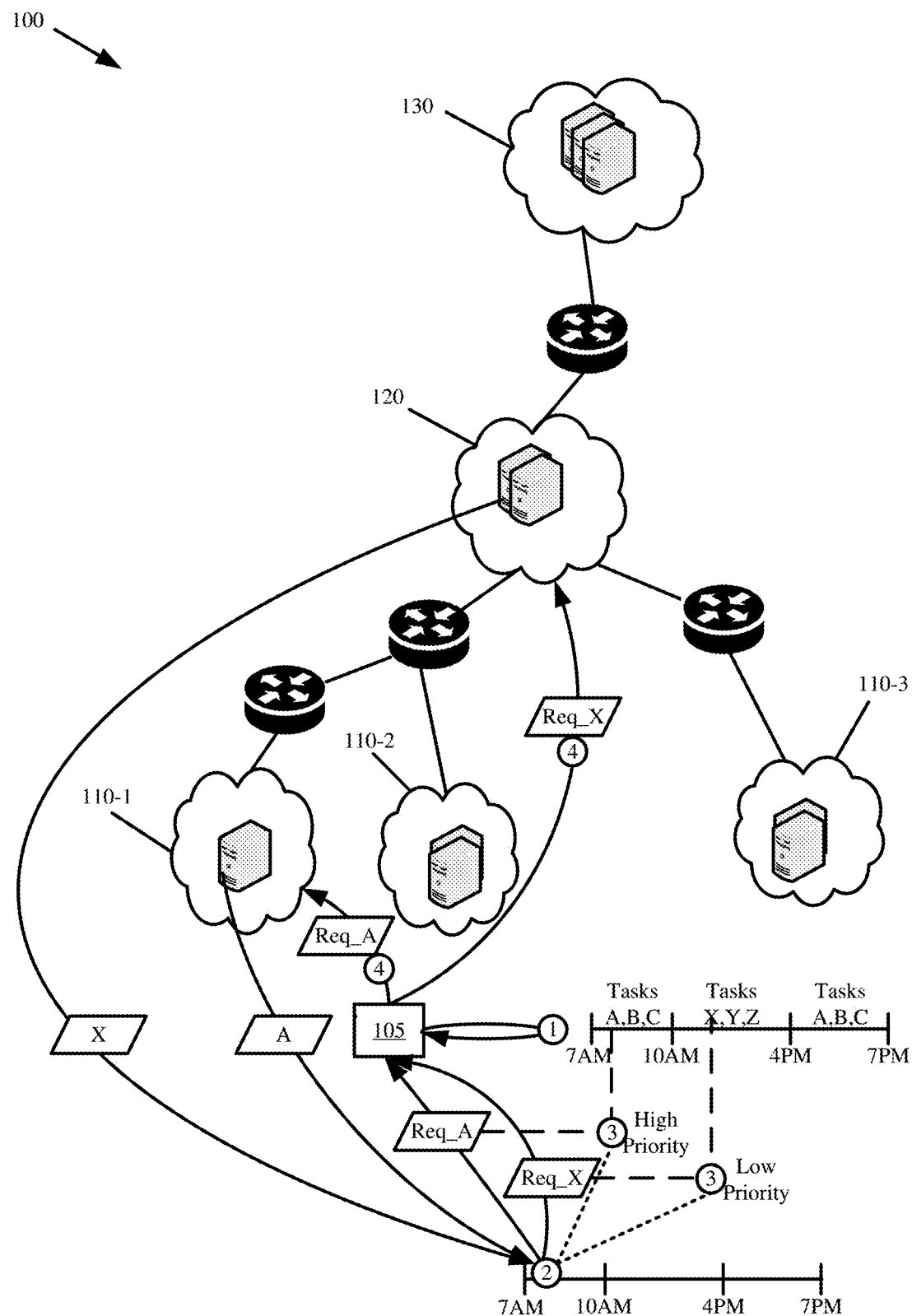
FIGS. 10A and 10B illustrate an example of using artificial intelligence or machine learning to dynamically change task priority in accordance with some embodiments presented herein.
Figure 10B:
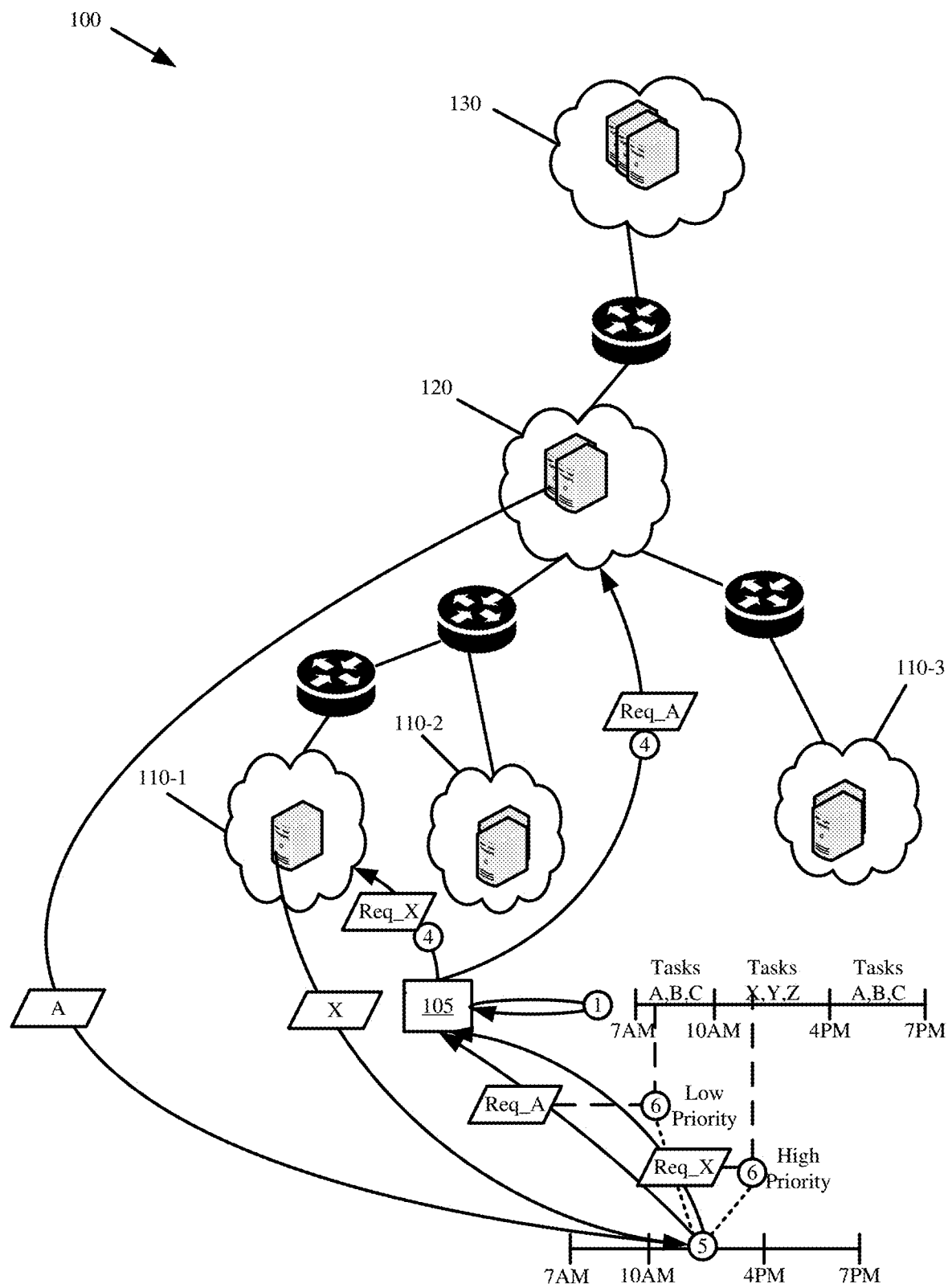

FIGS. 10A and 10B illustrate an example of controller 105 using artificial intelligence or machine learning to dynamically change task priority in accordance with some embodiments presented herein. As shown in FIG. 10A, controller 105 may monitor task execution and request patterns at one or more PoPs over a period of time, and may use artificial intelligence and/or machine learning in order to detect (at 1) different tasks that are prioritized at different times. For instance, controller 105 may detect (at 1) that between the hours of 10 AM to 4 PM, a majority of UEs 140 request a set of business-related tasks (e.g., tasks X, Y, and Z), and that between the hours of 7 AM to 10 AM and 4 PM to 7 PM, the majority of UEs request a set of entertainment related tasks (e.g., tasks A, B, and C).

Controller 105 may receive (at 2) a first request and a second request at 8 AM. Controller 105 may determine (at 3) that the first request is directed to one of the set of entertainment related tasks (e.g., task A), and that the second request is directed to one of the set of business-related tasks (e.g., task X). Controller 105 may further determine (at 3) that the first request is directed to a high priority task, and that the second request is directed to a low priority task based on the time-of-the-day that the requests were received.

Controller 105 may dynamically improve performance for the first request and the set of entertainment related tasks to ensure that the majority of UEs 140 receive a high quality-of-service during the 7 AM-10 AM time window. In particular, controller 105 may distribute (at 4) the first request to first-tier PoP 110-1 with the expectation that the same task associated with the first request is likely to be requested by multiple UEs 140 during the 7 AM-10 AM time window. Controller 105 may distribute (at 4) the second request to second-tier PoP 120 (or third-tier PoP 130) in order to preserve resources of first-tier PoP 110-1 for the set of entertainment tasks during the 7 AM-10 AM time window, and to prevent the business-related tasks that are requested by one or few UEs 140 during this time window from consuming resources at first-tier PoPs 110.

FIG. 10B illustrates controller 105 dynamically changing the distribution for subsequent third and fourth requests received (at 5) at 1 PM. Controller 105 may determine that the third request is directed to the same entertainment related task as the first request (e.g., task A), and that the second request is directed to the same business-related task as the second request (e.g., task X).

At this later time of day and based on the monitored request patterns, controller 105 may change (at 6) the priority of the tasks in order to dynamically improve performance for the business-related task of the fourth request and the set of business-related tasks. For instance, controller 105 may determine (at 6) that the third request is directed to a low priority task even though the earlier first request was directed to the same task and was previously classified as a high priority task. Similarly, controller 105 may determine (at 6) that the fourth request is directed to a high priority task, even though the earlier second request was directed to the same task and was classified as a low priority task.

Based on the dynamically changed priorities for the tasks, controller 105 may distribute (at 7) the fourth request to first-tier PoP 110-1 with the expectation that the same task associated with the fourth request is likely to be requested by multiple UEs 140 during the 10 AM-4 PM time window, and may distribute (at 7) the third request to second-tier PoP 120 (or third-tier PoP 130) in order to preserve resources of first-tier PoP 110-1 for the set of business-related tasks during the 10 AM-4 PM time window, and to prevent the entertainment related tasks that are requested by one or few UEs 140 during this time window from consuming resources at first-tier PoPs 110.

Figure 11:
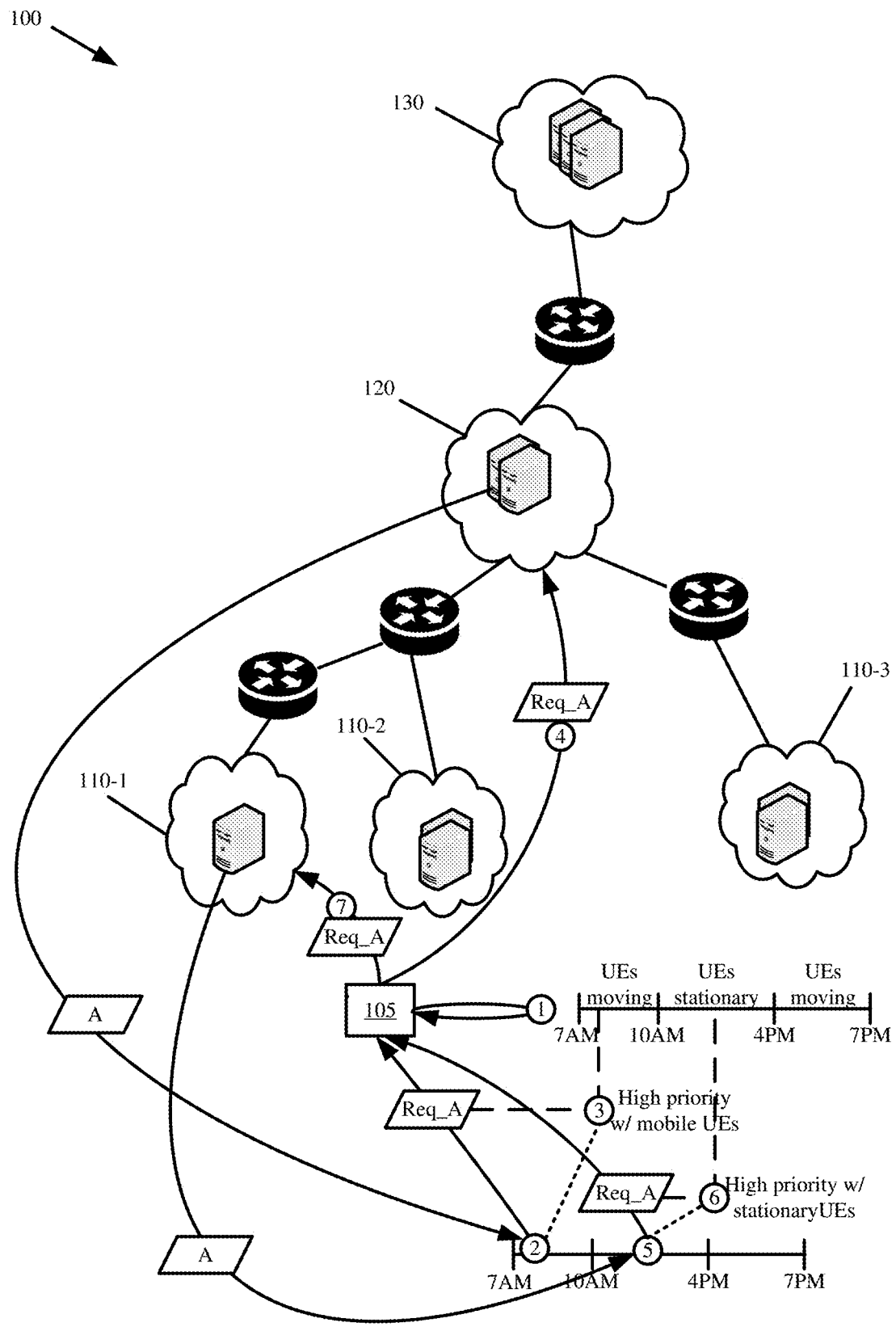
FIG. 11 illustrates an example of using artificial intelligence or machine learning to dynamically change task priority based on monitored user device mobility in accordance with some embodiments presented herein.

FIG. 11 illustrates an example of controller 105 using artificial intelligence or machine learning to dynamically change task priority based on monitored UE 140 mobility in accordance with some embodiments presented herein. In this example, controller 105 may monitor task execution and request patterns over a period of time in order to detect (at 1) that between the hours of 10 AM to 4 PM, a majority of UEs 140 are stationary, and that between the hours of 7 AM to 10 AM and 4 PM to 7 PM, the majority of UEs 140 are mobile.

Controller 105 may receive (at 2) a first request for a particular task (e.g., task A) at 8 AM. Controller 105 may determine (at 3) that the particular task is a prioritized task, and that first-tier PoPs 110 have sufficient resources to perform the particular task. However, controller 105 may use machine learning to determine (at 3) that, despite the particular task being a prioritized task, requesting UE 140 and other UEs 140 that may request the particular task are mobile during this time window. Consequently, the same task may need to be initialized across several or many first-tier PoPs 110 in order to provide the fastest possible performance for the particular task, and this may lead to an inefficient use of first-tier PoP 110 resources as well as a disproportionate allocation of first-tier PoP 110 resources to the particular task.

Controller 105 may use machine learning to determine that it is more efficient and a better use of resources to perform the particular task from second-tier PoP 120 (or third-tier PoP 130) that covers the different service regions that UEs 140 will cover during the time window. Accordingly, controller 105 may distribute (at 4) the first request and other requests for the particular task that are received during the 7 AM to 10 AM time window to second-tier PoP 120, and second-tier PoP 120 may satisfy each of those requests regardless of the requesting UE 140 location.

Controller 105 may receive (at 5) a second request for the same particular task at 1 PM. Here again, controller 105 may use machine learning to determine (at 6) that requesting UE 140 and other UEs 140, that may request the particular task, are stationary during this time window, and that first-tier PoP 110-1 is the fastest performing PoP for the stationary UEs 140. For instance, the stationary UEs 140 may now be concentrated in a downtown or business district of the city, and first-tier PoP 110-1 may be the fastest performing PoP for that area. In other words, the particular task may be utilized by many UEs 140 via first-tier PoP 110, leading to better resource utilization and efficient allocation of resources of first-tier PoP 110-1.

Accordingly, controller 105 may distribute (at 7) the second request to first-tier PoP 110-1 because requesting UEs 140 will continue to access the particular task from that same first-tier PoP 110-1 during the 10 AM to 4 PM time window, thereby maximizing utilization of first-tier PoP resources 110-1. In other words, controller 105 may determine that during this later time window, better performance can be provided from first-tier PoP 110-1 without redundantly populating different first-tier PoPs 110 with the same task in order to serve UEs 140 that are transitory.

Controller 105 may use one or more techniques to distribute requests between the different tiers in distributed platform 100. For instance, UE 140 may issue a request that is directed to a specific URL. A DNS query may be issued to resolve the domain name of the specific URL to a network address (e.g., an Internet Protocol address). In some embodiments, domain names that implicate tasks performed or hosted by distributed platform 100 may resolve to one or more network addresses assigned to controller 105. In some embodiments, domain names that implicate tasks performed or hosted by distributed platform 100 may resolve to an Anycast network address shared by the PoPs, or a network address of a closest PoP (e.g., network address of a first-tier PoP, second-tier PoP, or third-tier PoP that is closest to requesting UE 140 or resolving DNS server).

In any case, controller 105 may receive the request. In response to controller 105 selecting to distribute the request to a device operating in the same PoP as controller 105, controller 105 may select one of the devices in that PoP based on hash of the URL or other means, and may directly provide the request to the selected device. In some embodiments, controller 105 may have connections established with each device in a PoP, and may pass the request to a selected device using the established connected with the selected device. In some such embodiments, controller 105 may change the destination address of the request to match the unique network address of the selected device.

In response to controller 105 selecting to distribute the request to a different tier or PoP than a PoP to which the request is initially routed to or to the PoP in which controller 105 operates, controller 105 may identify a unique network address of the selected PoP, may change the destination address of the request to include the network address of the selected PoP, and may issue the request with the modified destination address to the selected PoP. As noted above, each PoP may be assigned a common Anycast address and also a unique unicast address. The Anycast address may be used to route requests to the closest PoP, whereas the unique unicast address can be used to directly route requests to a specific PoP.

Figure 12:
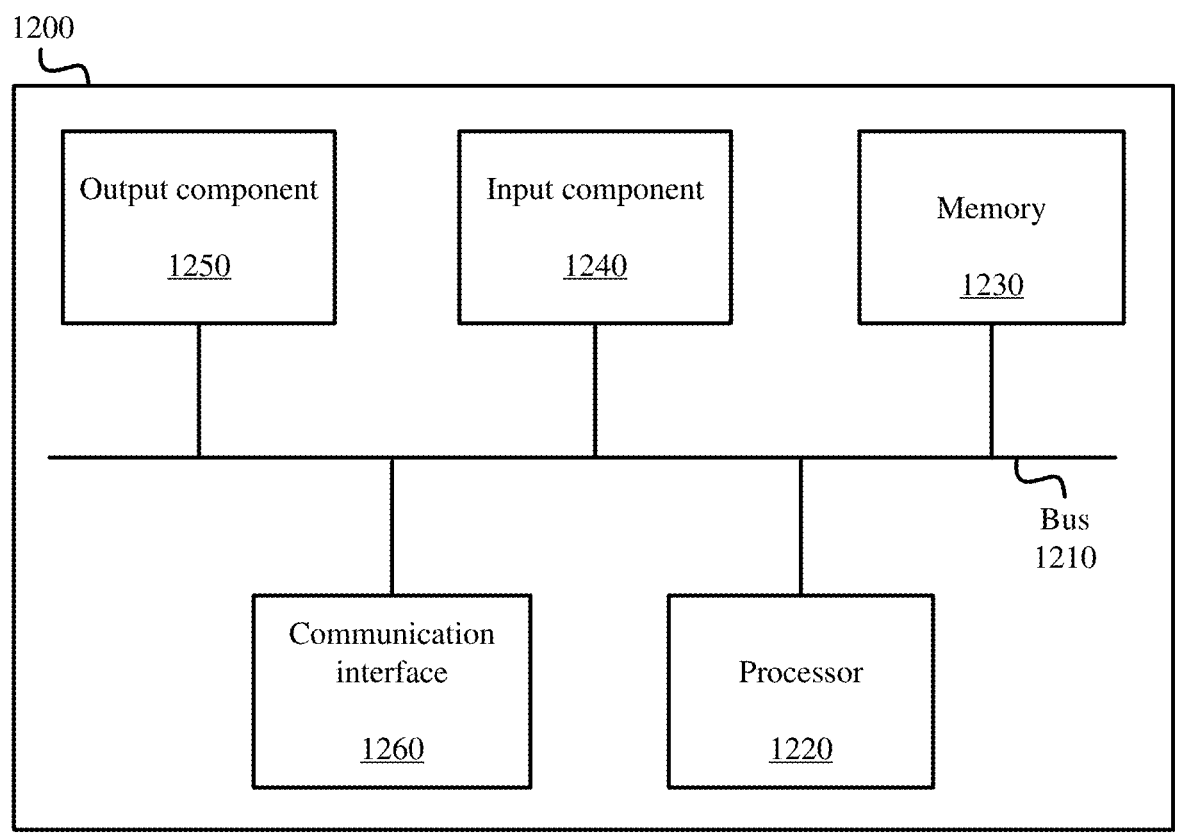
FIG. 12 illustrates example components of one or more devices, according to one or more embodiments described herein.

FIG. 12 is a diagram of example components of device 1200. Device 1200 may be used to implement one or more of the devices or systems described above (e.g., controller 105, devices 210, etc.). Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, controller 105 may execute as part of a load balancer, PoP gateway router, or request director. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the terra "less than or equal to" (or similar terms). As used herein, "exceeding" threshold (or similar terms) array be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a first request for a first task and a second request for a different second task at a first network location of a distributed platform, wherein the distributed platform comprises different distributed sets of resources at different network locations, wherein the first network location comprises a first set of resources, and wherein the first network location is a network location of the distributed platform that is closest to one or more user equipment ("UEs") submitting the first request and the second request;
classifying the first task as a prioritized task and the second task as a nonprioritized task;
determining availability of the first set of resources at a first time;
performing the first task at the first network location using the first set of resources in response to classifying the first task as the prioritized task and the availability of the first set of resources being less than a threshold;
selectively performing the second task at different network locations based on the availability of the first set of resources, wherein selectively performing the second task comprises:
  performing the second task at the first network location using the first set of resources in response to classifying the second task as the nonprioritized task and the availability of the first set of resources being greater than the threshold;
  performing the second task at a different second network location using a different second set of resources in response to classifying the second task as the nonprioritized task and the availability of the first set of resources being less than the threshold;
receiving a third request for the first task at the first network location at a second time;
determining that demand for the first task has changed between the first request and the third request;
changing classification of the first task from the prioritized task to the nonprioritized task in response to determining that the demand for the first task has changed; and
performing the first task at the second network location using the second set of resources in response to the third request as a result of changing classification of the first task to the nonprioritized task and the availability of the first set of resources being less than the threshold.

2. The method of claim 1, wherein each set of the distributed sets of resources corresponds to a different Point-of-Presence ("PoP") of the distributed platform, and wherein each PoP comprises a different number of devices that provide one or more of content caching, service distribution, and function execution.

3. The method of claim 1, wherein said classifying the first task as the prioritized task is based on a first set of inputs obtained from a task originator that uploads the first task to the distributed platform.

4. The method of claim 3, wherein said classifying the first task as the prioritized task is further based on a second set of inputs obtained from a UE submitting the first request.

5. The method of claim 1 further comprising:
providing the distributed sets of resources in a tiered arrangement, wherein said providing comprises:
  locating the first set of resources in a first tier that is closest to the one or more UEs; and locating the second set of resources in a second tier that is one or more network hops removed from the one or more UEs than the first tier.

6. The method of claim 1 further comprising:
routing the first request to the first network location of the distributed platform based on proximity between the one or more UEs and the first set of resources.

7. The method of claim 1,
wherein the first network location with the first set of resources comprises fewer devices than the second network location with the second set of resources; and wherein the first set of resources are less than the second set of resources.

8. The method of claim 1 further comprising:
generating a first score based on the first task;
generating a second score based on the availability of the first set of resources at the first time; and
selecting between the first set of resources and the second set of resources for performing the first task in response to comparing the first score to the second score.

9. The method of claim 1, wherein said classifying comprises:
determining one or more of a first pricing tier or first performance tier associated with a first task originator providing the first task to the distributed platform, and one or more of a second pricing tier or second performance tier associated with a second task originator providing the second task to the distributed platform;
selecting the first task to be the prioritized task based on the first pricing tier or the first performance tier associated with the first task originator; and
selecting the second task to be the nonprioritized task based on the second pricing tier or the second performance tier associated with the second task originator.

10. The method of claim 1 further comprising:
determining that a first UE submitting the first request is stationary, and that a second UE submitting the second request is moving; and
wherein said classifying comprises determining the first task to be the prioritized task based in part on the first UE being stationary, and the second task to be the nonprioritized task based in part on the second UE moving.

11. A method comprising:
receiving at least a first request from a first user equipment ("UE") and a second request from a second UE operating in a same region as the first UE, wherein the first and second requests are directed to different first and second tasks respectively;
identifying a first set of resources from different distributed sets of resources of a distributed platform with which to complete the first task and the second task in a least amount of time, wherein the distributed sets of resources are located at a plurality of network locations of the distributed platform, and wherein the first set of resources is located at a first network location of the distributed platform;
determining availability of the first set of resources to be less than a threshold;
determining that the first UE is stationary, and that the second UE is transitory and moving across two or more of the plurality of network locations;
providing the first request to the first network location with the first set of resources in response to determining that the first UE is stationary and further in response to determining the availability of the first set of resources to be less than the threshold;
providing the second request to a different second network location with a different second set of resources in response to determining that the second UE is transitory and further in response to determining the availability of the first set of resources to be less than the threshold;
receiving, from the first UE, a third request directed to a third task;
determining that demand for the third task is different than demand for the first task; and providing the third request to the second network location in response to determining that the availability of the first set of resources is less than the threshold and that the demand for the third task is different than the demand for the first task.

12. The method of claim 11 comprising:
receiving a fourth request from the second UE;
determining availability of the first set of resources to be more than the threshold upon receiving the fourth request; and
providing the fourth request to the first network location in response to determining that the second UE is transitory and further in response to determining the availability of the first set of resources to be more than the threshold.

13. The method of claim 11 further comprising:
routing the first request and the second request to the first network location of the distributed platform with the first set of resources based on the first set of resources being located in a network location of the distributed platform that is closest to the region from which the first request and the second request originate.

14. The method of claim 11 further comprising:
classifying the first task as a prioritized task based on the first UE or a first task originator, that provides the first task, being associated with a premium profile; and
classifying the second task as a nonprioritized task based on the second UE or a second task originator, that provides the second task, being associated with a standard profile.

15. A device comprising:
one or more processors configured to:
  receive a first request for a first task and a second request for a different second task from a common region;
  classifying the first task as a prioritized task and the second task as a nonprioritized task;
  determine availability of the first set of resources at a first network location of a distributed platform during a first time; and
  perform the first task at the first network location using the first set of resources in response to classifying the first task as the prioritized task and the availability of the first set of resources being less than a threshold;
  selectively perform the second task at different network locations based on the availability of the first set of resources, wherein selectively performing the second task comprises:
    perform the second task at the first network location using the first set of resources in response to classifying the second task as the nonprioritized task and the availability of the first set of resources being greater than the threshold;
    perform the second task at a different second network location of the distributed platform using a different second set of resources in response to classifying the second task as the nonprioritized task and the availability of the first set of resources being less than the threshold;
  receive a third request for the first task from the common region at a second time;
  determine that demand for the first task has changed between the first request and the third request;
  change classification of the first task from the prioritized task to the nonprioritized task in response to determining that the demand for the first task has changed; and
  perform the first task at the second network location using the second set of resources in response to the third request as a result of changing classification of the first task to the nonprioritized task and the availability of the first set of resources being less than the threshold.

* * * * *